(12) United States Patent
Lamb

(10) Patent No.: US 9,417,845 B2
(45) Date of Patent: Aug. 16, 2016

(54) METHOD AND APPARATUS FOR PRODUCING PROGRAMMABLE PROBABILITY DISTRIBUTION FUNCTION OF PSEUDO-RANDOM NUMBERS

(71) Applicant: QUALCOMM Incorporated, San Diego, CA (US)

(72) Inventor: Aaron Douglass Lamb, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 200 days.

(21) Appl. No.: 14/195,988

(22) Filed: Mar. 4, 2014

(65) Prior Publication Data

US 2015/0095274 A1 Apr. 2, 2015

Related U.S. Application Data

(60) Provisional application No. 61/885,980, filed on Oct. 2, 2013.

(51) Int. Cl.
*G06F 15/18* (2006.01)
*G06F 7/58* (2006.01)
*G06N 3/04* (2006.01)
*G06N 3/063* (2006.01)

(52) U.S. Cl.
CPC .............. *G06F 7/584* (2013.01); *G06N 3/049* (2013.01); *G06N 3/0472* (2013.01); *G06N 3/063* (2013.01)

(58) Field of Classification Search
CPC ... G06N 5/02; G06N 3/0454; G05B 13/0265; G06F 7/584

USPC ...................................... 706/12, 45
See application file for complete search history.

(56) References Cited

U.S. PATENT DOCUMENTS

| 5,063,351 | A | * | 11/1991 | Goldthorp | H04B 3/487 |
| | | | | | 324/603 |
| 5,475,795 | A | * | 12/1995 | Taylor | G06N 3/0472 |
| | | | | | 706/41 |
| 5,745,525 | A | * | 4/1998 | Hunsinger | H04B 1/406 |
| | | | | | 375/147 |
| 5,907,822 | A | * | 5/1999 | Prieto, Jr. | G10L 19/005 |
| | | | | | 704/202 |
| 5,987,483 | A | | 11/1999 | Edelkind et al. | |
| 6,058,206 | A | * | 5/2000 | Kortge | G06N 3/0454 |
| | | | | | 382/157 |
| 6,792,439 | B2 | | 9/2004 | Schmidt | |

(Continued)

OTHER PUBLICATIONS

Fiete et al., Gradient Learning in Spiking Neural Networks by Dynamic Perturbation of Conductances, 2006, The American Physical Society, pp. 1-4.*

(Continued)

*Primary Examiner* — David Vincent
(74) *Attorney, Agent, or Firm* — Patterson & Sheridan, L.L.P.

(57) ABSTRACT

Certain aspects of the present disclosure provide methods and apparatus for producing programmable probability distribution function of pseudo-random numbers that can be utilized for filtering (dropping and passing) neuron spikes. The present disclosure provides a simpler, smaller, and lower-power circuit than that typically used. It can be programmed to produce any of a variety of non-uniformly distributed sequences of numbers. These sequences can approximate true probabilistic distributions, but maintain sufficient pseudo-randomness to still be considered random in a probabilistic sense. This circuit can be an integral part of a filter block within an ASIC chip emulating an artificial nervous system.

32 Claims, 20 Drawing Sheets

(56) References Cited

U.S. PATENT DOCUMENTS

| | | | |
|---|---|---|---|
| 7,860,912 B1 | 12/2010 | Gyugyi et al. | |
| 8,130,950 B2 | 3/2012 | Dolgunov et al. | |
| 8,352,384 B2 | 1/2013 | Mansinghka et al. | |
| 2004/0098147 A1* | 5/2004 | Voon | G05B 13/0285 700/50 |
| 2008/0255684 A1* | 10/2008 | Wong | G05B 13/0285 700/50 |
| 2009/0135886 A1* | 5/2009 | Robertson | A61N 1/37252 375/133 |
| 2009/0228238 A1* | 9/2009 | Mansinghka | G06N 7/04 702/181 |
| 2010/0070549 A1 | 3/2010 | Nagaraj | |
| 2013/0073598 A1* | 3/2013 | Jacobson | G06F 7/588 708/252 |
| 2013/0197875 A1* | 8/2013 | Shirley | G01R 31/31718 703/2 |

OTHER PUBLICATIONS

Cui W., et al., "Digital random sequence generation algorithm and VLSI implementation", Chinese Journal of Electronics, Apr. 5, 2010, vol. 19, No. 2E, pp. 351-355, XP055207098, ISSN: 1022-4653 figure 3, section III.

Fung D., et al., "ASIC implementation of a high speed WGNG for communication channel emulation", Proceedings of the 2004 IEEE Workshop on Signal Processing Systems 2004 (SIPS'04), Oct. 13, 2004, pp. 304-309, XP010743978, DOI: 10.1109/SIPS.2004.1363067 figure 2 and section 2.

International Search Report and Written Opinion—PCT/US2014/053649—ISA/EPO—Aug. 19, 2015.

Thomas D., et al., "FPGA accelerated simulation of biologically plausible spiking neural networks", Proceedings of the 17TH IEEE Symposium on Field Programmable Custom Computing Machines (FCCM'09), Apr. 5, 2009, pp. 45-52, XP031548924, DOI: 10.1109/FCCM.2009.46.

Thomas D.B., et al., "Multiplierless algorithm for multivariate Gaussian random number generation in FPGAs", IEEE Transactions on Very Large Scale Integration (VLSI) Systems, Jan. 10, 2013, vol. 21, No. 12, pp. 2193-2205, XP011530553, DOI: 10.1109/TVLS1.2012.2228017 figure 3, sections III and IV US 7 860 912 B1 (Gyugyi Paul J [US] et al) Dec. 28, 2010 figure 5, columns 8-9.

Thomas D.B., et al., "Non-uniform random number generation through piecewise linear approximations", IET Computers & Digital Techniques, Jul. 23, 2007, vol. 1, No. 4, pp. 312-321, XP006029088, DOI: 10.1049/iet-cdt:20060188 figure 3, sections 3 and 4.

* cited by examiner

Number of Comparisons per Clock Cycle to Support Given Drop Rates

| Drop Rate for Full BW | # Comparisons per Clk Cycle |
|---|---|
| 50% | 2 |
| 66% | 3 |
| 75% | 4 |
| 80% | 5 |
| 87% | 8 |
| 93% | 16 |
| 96% | 32 |
| 99% | 100 |

METHOD AND APPARATUS FOR PRODUCING PROGRAMMABLE PROBABILITY DISTRIBUTION FUNCTION OF PSEUDO-RANDOM NUMBERS

CLAIM OF PRIORITY UNDER 35 U.S.C. §119

This application claims benefit of U.S. Provisional Patent Application Ser. No. 61/885,980, filed Oct. 2, 2013 and entitled "Method and Apparatus for Producing Programmable Probability Distribution Function of Pseudo-Random Numbers," incorporated by reference in its entirety.

BACKGROUND

1. Field

Certain aspects of the present disclosure generally relate to artificial nervous systems and, more particularly, to methods and apparatus for producing programmable probability distribution function of pseudo-random numbers utilized for filtering (dropping and passing) neuron spikes.

2. Background

An artificial neural network, which may comprise an interconnected group of artificial neurons (i.e., neural processing units), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome.

One type of artificial neural network is the spiking neural network, which incorporates the concept of time into its operating model, as well as neuronal and synaptic state, thereby providing a rich set of behaviors from which computational function can emerge in the neural network. Spiking neural networks are based on the concept that neurons fire or "spike" at a particular time or times based on the state of the neuron, and that the time is important to neuron function. When a neuron fires, it generates a spike that travels to other neurons, which, in turn, may adjust their states based on the time this spike is received. In other words, information may be encoded in the relative or absolute timing of spikes in the neural network.

SUMMARY

Certain aspects of the present disclosure provide a method for artificial nervous system operations. The method generally includes generating a sequence of random numbers, performing bit-level operations on the generated sequence of random numbers to generate a first sequence of pseudo-random numbers with programmable probability distribution function (PDF), generating another sequence of random numbers; and performing bit-level operations between the first sequence and the other sequence to generate a second sequence of pseudo-random numbers with programmable PDF.

Certain aspects of the present disclosure provide an apparatus for artificial nervous system operations. The apparatus generally includes a first circuit configured to generate a sequence of random numbers, a second circuit configured to perform bit-level operations on the generated sequence of random numbers to generate a first sequence of pseudo-random numbers with programmable probability distribution function (PDF), a third circuit configured to generate another sequence of random numbers, and a fourth circuit configured to perform bit-level operations between the first sequence and the other sequence to generate a second sequence of pseudo-random numbers with programmable PDF.

Certain aspects of the present disclosure provide an apparatus for artificial nervous system operations. The apparatus generally includes means for generating a sequence of random numbers, means for performing bit-level operations on the generated sequence of random numbers to generate a first sequence of pseudo-random numbers with programmable probability distribution function (PDF), means for generating another sequence of random numbers, and means for performing bit-level operations between the first sequence and the other sequence to generate a second sequence of pseudo-random numbers with programmable PDF.

Certain aspects of the present disclosure provide a computer program product for artificial nervous system operations. The computer program product generally includes a non-transitory computer-readable medium (e.g., a storage device) having instructions executable to generate a sequence of random numbers, perform bit-level operations on the generated sequence of random numbers to generate a first sequence of pseudo-random numbers with programmable probability distribution function (PDF), generate another sequence of random numbers; and perform bit-level operations between the first sequence and the other sequence to generate a second sequence of pseudo-random numbers with programmable PDF.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
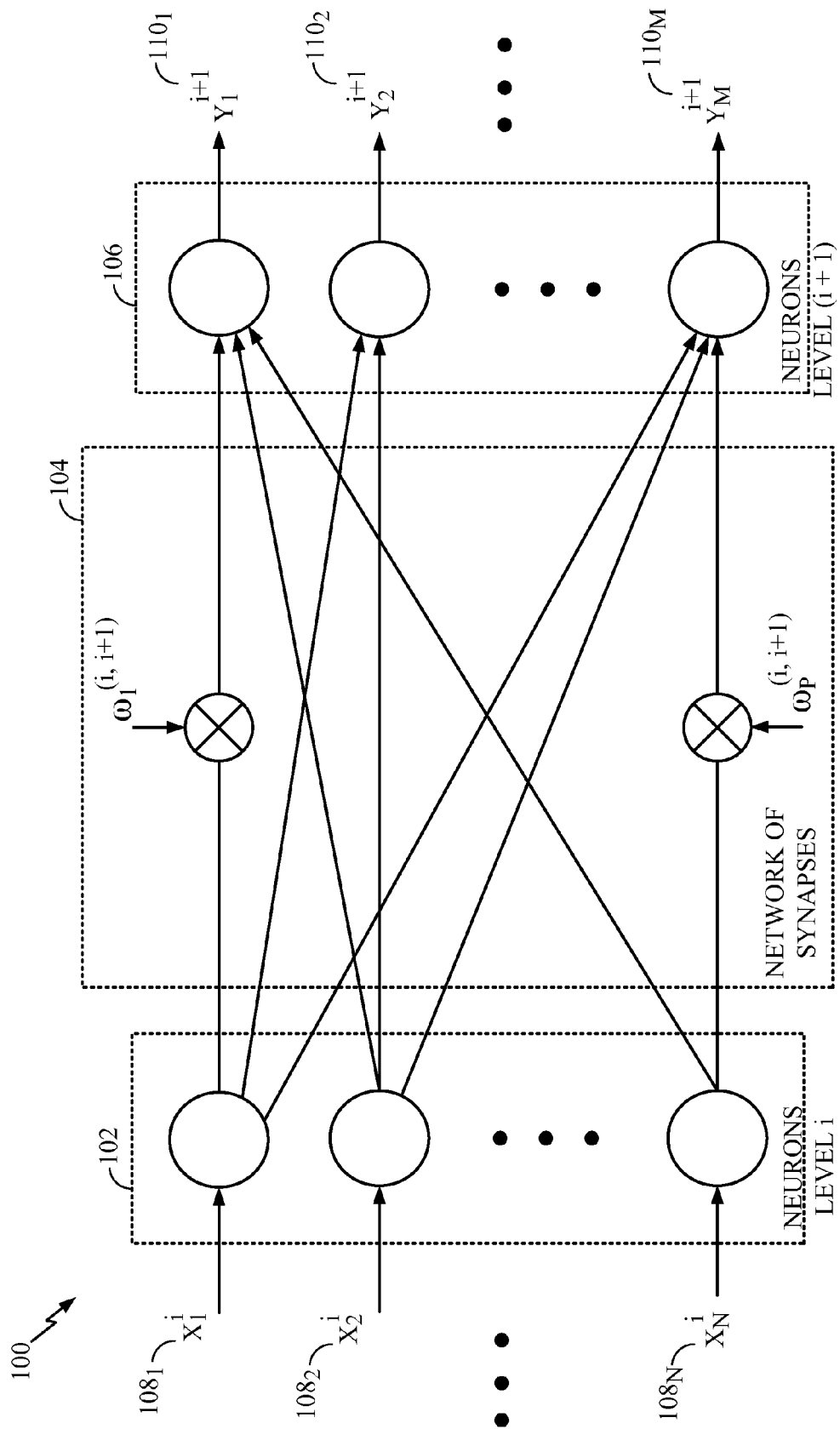
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104 (i.e., feed-forward connections). For simplicity, only two levels of neurons are illustrated in FIG. 1, although fewer or more levels of neurons may exist in a typical neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by a plurality of neurons of a previous level (not shown in FIG. 1). The signal 108 may represent an input (e.g., an input current) to the level 102 neuron. Such inputs may be accumulated on the neuron membrane to charge a membrane potential. When the membrane potential reaches its threshold value, the neuron may fire and generate an output spike to be transferred to the next level of neurons (e.g., the level 106). Such behavior can be emulated or simulated in hardware and/or software, including analog and digital implementations.

In biological neurons, the output spike generated when a neuron fires is referred to as an action potential. This electrical signal is a relatively rapid, transient, all-or nothing nerve impulse, having an amplitude of roughly 100 mV and a duration of about 1 ms. In a particular aspect of a neural system having a series of connected neurons (e.g., the transfer of spikes from one level of neurons to another in FIG. 1), every action potential has basically the same amplitude and duration, and thus, the information in the signal is represented only by the frequency and number of spikes (or the time of spikes), not by the amplitude. The information carried by an action potential is determined by the spike, the neuron that spiked, and the time of the spike relative to one or more other spikes.

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104). For certain aspects, these signals may be scaled according to adjustable synaptic weights $w_1^{(i,i+1)}, \ldots, w_P^{(i,i+1)}$ (where P is a total number of synaptic connections between the neurons of levels 102 and 106). For other aspects, the synapses 104 may not apply any synaptic weights. Further, the (scaled) signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

Biological synapses may be classified as either electrical or chemical. While electrical synapses are used primarily to send excitatory signals, chemical synapses can mediate either excitatory or inhibitory (hyperpolarizing) actions in postsynaptic neurons and can also serve to amplify neuronal signals. Excitatory signals typically depolarize the membrane potential (i.e., increase the membrane potential with respect to the resting potential). If enough excitatory signals are received within a certain period to depolarize the membrane potential above a threshold, an action potential occurs in the postsynaptic neuron. In contrast, inhibitory signals generally hyperpolarize (i.e., lower) the membrane potential Inhibitory signals, if strong enough, can counteract the sum of excitatory signals and prevent the membrane potential from reaching threshold. In addition to counteracting synaptic excitation, synaptic inhibition can exert powerful control over spontaneously active neurons. A spontaneously active neuron refers to a neuron that spikes without further input, for example, due to its dynamics or feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and the like. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, wherein a particular functionality may be based on synaptic weights stored in a memory card currently attached to the neural processor.

Figure 2:
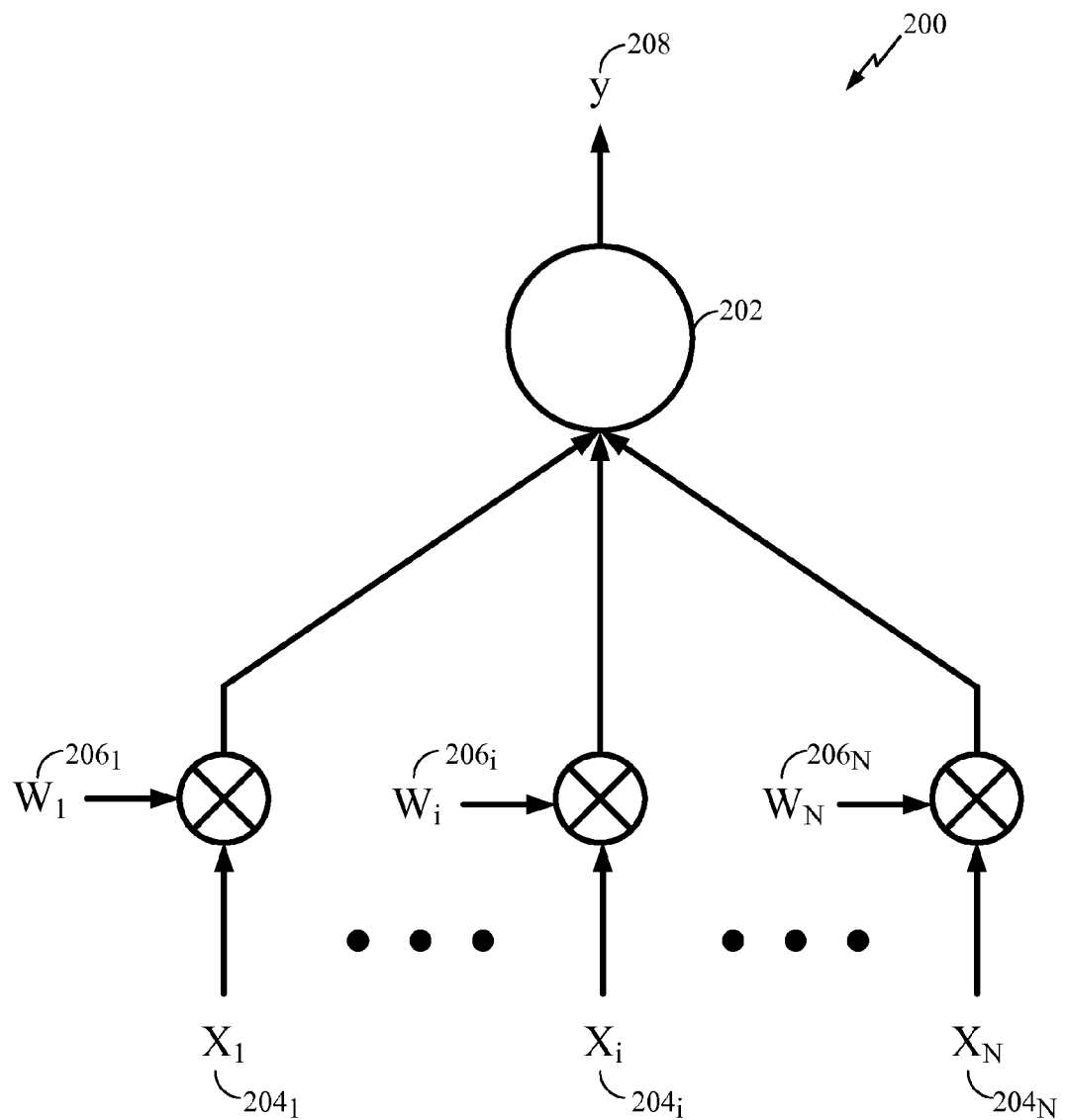
FIG. 2 illustrates an example processing unit (neuron) of a computational network (neural system or neural network), in accordance with certain aspects of the present disclosure.

FIG. 2 illustrates an example 200 of a processing unit (e.g., an artificial neuron 202) of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$ ($x_1$-$x_N$), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($w_1$-$w_N$), where N may be a total number of input connections of the neuron 202.

The neuron 202 may combine the scaled input signals and use the combined scaled inputs to generate an output signal 208 (i.e., a signal y). The output signal 208 may be a current, or a voltage, real-valued or complex-valued. The output signal may comprise a numerical value with a fixed-point or a floating-point representation. The output signal 208 may be then transferred as an input signal to other neurons of the same neural system, or as an input signal to the same neuron 202, or as an output of the neural system.

The processing unit (neuron 202) may be emulated by an electrical circuit, and its input and output connections may be emulated by wires with synaptic circuits. The processing unit, its input and output connections may also be emulated by a software code. The processing unit may also be emulated by an electric circuit, whereas its input and output connections may be emulated by a software code. In an aspect, the processing unit in the computational network may comprise an analog electrical circuit. In another aspect, the processing unit may comprise a digital electrical circuit. In yet another aspect, the processing unit may comprise a mixed-signal electrical circuit with both analog and digital components. The computational network may comprise processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Some examples of the learning rule are the spike-timing-dependent plasticity (STDP) learning rule, the Hebb rule, the Oja rule, the Bienenstock-Copper-Munro (BCM) rule, etc. Very often, the weights may settle to one of two values (i.e., a bimodal distribution of weights). This effect can be utilized to reduce the number of bits per synaptic weight, increase the speed of reading and writing from/to a memory storing the synaptic weights, and to reduce power consumption of the synaptic memory.

Synapse Type

In hardware and software models of neural networks, processing of synapse related functions can be based on synaptic type. Synapse types may comprise non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of this is that processing can be subdivided. For example, non-plastic synapses may not require plasticity functions to be executed (or waiting for such functions to complete). Similarly, delay and weight plasticity may be subdivided into operations that may operate in together or separately, in sequence or in parallel. Different types of synapses may have different lookup tables or formulas and parameters for each of the different plasticity types that apply. Thus, the methods would access the relevant tables for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) since structural plasticity (i.e., an amount of delay change) may be a direct function of pre-post spike time difference. Alternatively, it may be set as a function of the weight change amount or based on conditions relating to bounds of the weights or weight changes. For example, a synaptic delay may change only when a weight change occurs or if weights reach zero, but not if the weights are maxed out. However, it can be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as to computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity, and homeostatic plasticity.

STDP is a learning process that adjusts the strength of synaptic connections between neurons, such as those in the brain. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. In contrast, long-term depression (LTD) may occur if an input spike tends, on average, to occur immediately after an output spike. Then, that particular input is made somewhat weaker, hence the name "spike-timing-dependent plasticity." Consequently, inputs that might be the cause of the post-synaptic neuron's excitation are made even more likely to contribute in the future, whereas inputs that are not the cause of the post-synaptic spike are made less likely to contribute in the future. The process continues until a subset of the initial set of connections remains, while the influence of all others is reduced to zero or near zero.

Since a neuron generally produces an output spike when many of its inputs occur within a brief period (i.e., being sufficiently cumulative to cause the output,), the subset of inputs that typically remains includes those that tended to be correlated in time. In addition, since the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a pre-synaptic neuron to a post-synaptic neuron as a function of time difference between spike time $t_{pre}$ of the pre-synaptic neuron and spike time $t_{post}$ of the post-synaptic neuron (i.e., $t=t_{post}-t_{pre}$). A typical formulation of the STDP is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron).

In the STDP process, a change of the synaptic weight over time may be typically achieved using an exponential decay, as given by, $$\Delta w(t) = \begin{cases} a_+ e^{-t/k_+} + \mu, & t > 0 \\ a_- e^{t/k_-}, & t < 0 \end{cases} \quad (1)$$

where $k_+$ and $k_-$ are time constants for positive and negative time difference, respectively, $a_+$ and $a_-$ are corresponding scaling magnitudes, and $\mu$ is an offset that may be applied to the positive time difference and/or the negative time difference.

Figure 3:
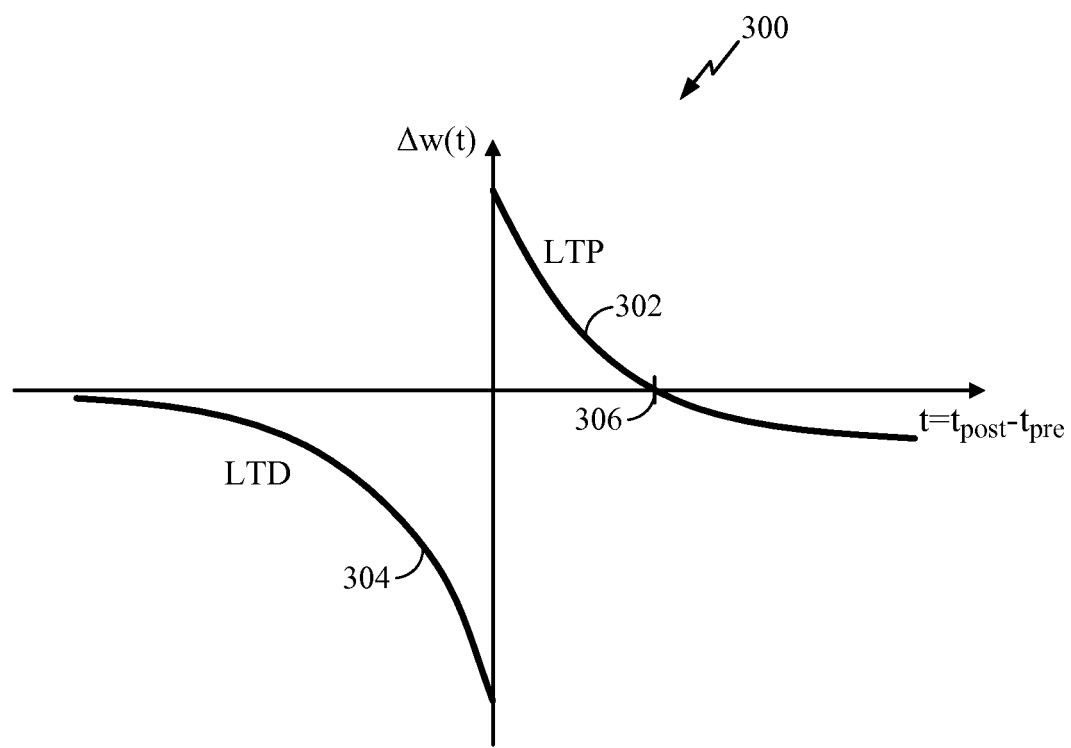
FIG. 3 illustrates an example spike-timing dependent plasticity (STDP) curve in accordance with certain aspects of the present disclosure.

FIG. 3 illustrates an example graph 300 of a synaptic weight change as a function of relative timing of pre-synaptic and post-synaptic spikes in accordance with STDP. If a pre-synaptic neuron fires before a post-synaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between pre-synaptic and post-synaptic spike times. The reverse order of firing may reduce the synaptic weight, as illustrated in a portion 304 of the graph 300, causing an LTD of the synapse.

As illustrated in the graph 300 in FIG. 3, a negative offset $\mu$ may be applied to the LTP (causal) portion 302 of the STDP graph. A point of cross-over 306 of the x-axis (y=0) may be configured to coincide with the maximum time lag for considering correlation for causal inputs from layer i−1 (presynaptic layer). In the case of a frame-based input (i.e., an input is in the form of a frame of a particular duration comprising spikes or pulses), the offset value $\mu$ can be computed to reflect the frame boundary. A first input spike (pulse) in the frame may be considered to decay over time either as modeled by a post-synaptic potential directly or in terms of the effect on neural state. If a second input spike (pulse) in the frame is considered correlated or relevant of a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset $\mu$ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and have stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any) can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics, $$\frac{dv_n(t)}{dt} = \alpha v_n(t) + \beta \sum_m w_{m,n} y_m(t - \Delta t_{m,n}), \quad (2)$$

where $\alpha$ and $\beta$ are parameters, $w_{m,n}$ is a synaptic weight for the synapse connecting a pre-synaptic neuron m to a post-synaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a post-synaptic neuron is established until the time when the post-synaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e., $$\frac{dv}{dt} = (k(v - v_t)(v - v_r) - u + I)/C, \quad (3)$$

$$\frac{du}{dt} = a(b(v - v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v>v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in biologically-consistent linear fashion. The time constant in the supra-threshold regime, positive by convention, reflects anti-leaky channel dynamics generally driving a cell to spike while incurring latency in spike-generation.

Figure 4:
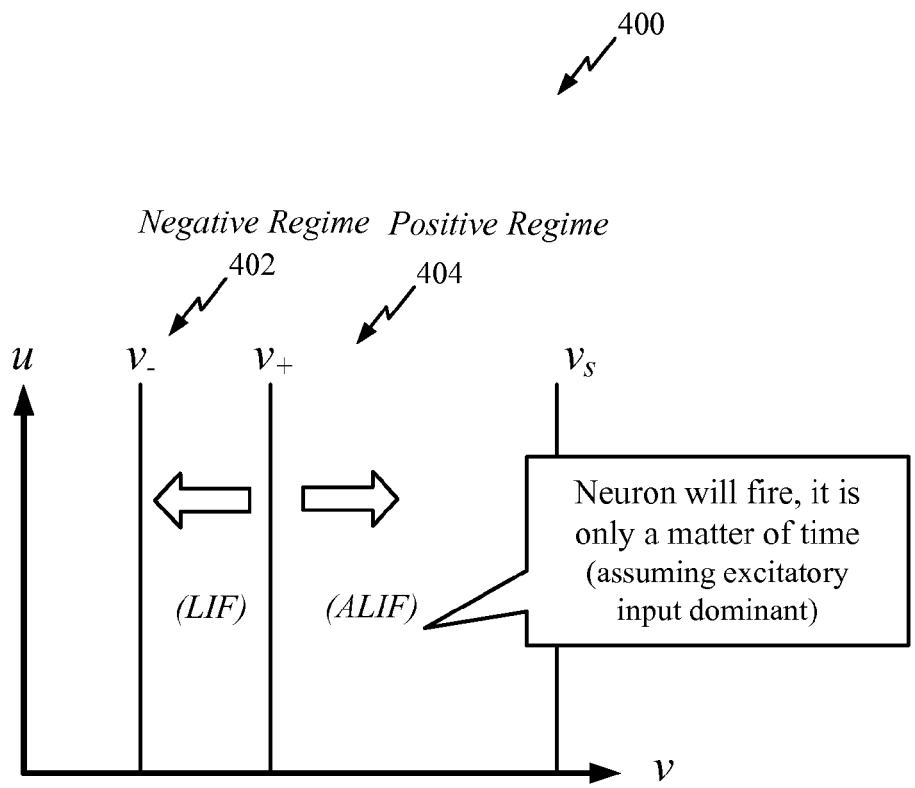
FIG. 4 is an example graph of state for an artificial neuron, illustrating a positive regime and a negative regime for defining behavior of the neuron, in accordance with certain aspects of the present disclosure.

As illustrated in FIG. 4, the dynamics of the model may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest ($v_-$) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as, $$\tau_\rho \frac{dv}{dt} = v + q_\rho \quad (5)$$

$$-\tau_u \frac{du}{dt} = u + r \quad (6)$$

where $q_\rho$ and r are the linear transformation variables for coupling.

The symbol $\rho$ is used herein to denote the dynamics regime with the convention to replace the symbol $\rho$ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are $$q_\rho = -\tau_\rho \beta u - v_\rho \quad (7)$$

$$r = \delta(v + \epsilon) \quad (8)$$

where $\delta$, $\epsilon$, $\beta$ and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter $\delta$ is a scale factor controlling the slope of the u null-cline. The parameter $\epsilon$ is typically set equal to $-v_-$. The parameter $\beta$ is a resistance value controlling the slope of the v null-clines in both regimes. The $\tau_\rho$ time-constant parameters control not only the exponential decays, but also the null-cline slopes in each regime separately.

The model is defined to spike when the voltage v reaches a value $v_S$. Subsequently, the state is typically reset at a reset event (which technically may be one and the same as the spike event):

$$v = \hat{v}_- \tag{9}$$

$$u = u + \Delta u \tag{10}$$

where $\hat{v}_-$ and $\Delta u$ are parameters. The reset voltage $\hat{v}_-$ is typically set to $v_-$.

By a principle of momentary coupling, a closed-form solution is possible not only for state (and with a single exponential term), but also for the time required to reach a particular state. The closed-form state solutions are $$v(t + \Delta t) = (v(t) + q_\rho)e^{\frac{\Delta t}{\tau_\rho}} - q_\rho \tag{11}$$

$$u(t + \Delta t) = (u(t) + r)e^{-\frac{\Delta t}{\tau_u}} - r \tag{12}$$

Therefore, the model state may be updated only upon events, such as upon an input (pre-synaptic spike) or output (post-synaptic spike). Operations may also be performed at any particular time (whether or not there is input or output).

Moreover, by the momentary coupling principle, the time of a post-synaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by $$\Delta t = \tau_\rho \log \frac{v_f + q_\rho}{v_0 + q_\rho} \tag{13}$$

If a spike is defined as occurring at the time the voltage state v reaches $v_S$, then the closed-form solution for the amount of time, or relative delay, until a spike occurs as measured from the time that the voltage is at a given state v is $$\Delta t_S = \begin{cases} \tau_+ \log \frac{v_s + q_+}{v + q_+} & \text{if } v > \hat{v}_+ \\ \infty & \text{otherwise} \end{cases} \tag{14}$$

where $\hat{v}_+$ is typically set to parameter $v_+$, although other variations may be possible.

The above definitions of the model dynamics depend on whether the model is in the positive or negative regime. As mentioned, the coupling and the regime ρ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily require iterative methods or Numerical methods. An event-based implementation is also possible at a limited time resolution in a step-based simulator by only updating the model if an event occurs at or between steps or by "step-event" update.

Neural Coding

A useful neural network model, such as one composed of the artificial neurons 102, 106 of FIG. 1, may encode information via any of various suitable neural coding schemes, such as coincidence coding, temporal coding or rate coding. In coincidence coding, information is encoded in the coincidence (or temporal proximity) of action potentials (spiking activity) of a neuron population. In temporal coding, a neuron encodes information through the precise timing of action potentials (i.e., spikes) whether in absolute time or relative time. Information may thus be encoded in the relative timing of spikes among a population of neurons. In contrast, rate coding involves coding the neural information in the firing rate or population firing rate.

If a neuron model can perform temporal coding, then it can also perform rate coding (since rate is just a function of timing or inter-spike intervals). To provide for temporal coding, a good neuron model should have two elements: (1) arrival time of inputs affects output time; and (2) coincidence detection can have a narrow time window. Connection delays provide one means to expand coincidence detection to temporal pattern decoding because by appropriately delaying elements of a temporal pattern, the elements may be brought into timing coincidence.

Arrival Time

In a good neuron model, the time of arrival of an input should have an effect on the time of output. A synaptic input—whether a Dirac delta function or a shaped post-synaptic potential (PSP), whether excitatory (EPSP) or inhibitory (IPSP)—has a time of arrival (e.g., the time of the delta function or the start or peak of a step or other input function), which may be referred to as the input time. A neuron output (i.e., a spike) has a time of occurrence (wherever it is measured, e.g., at the soma, at a point along the axon, or at an end of the axon), which may be referred to as the output time. That output time may be the time of the peak of the spike, the start of the spike, or any other time in relation to the output waveform. The overarching principle is that the output time depends on the input time.

One might at first glance think that all neuron models conform to this principle, but this is generally not true. For example, rate-based models do not have this feature. Many spiking models also do not generally conform. A leaky-integrate-and-fire (LIF) model does not fire any faster if there are extra inputs (beyond threshold). Moreover, models that might conform if modeled at very high timing resolution often will not conform when timing resolution is limited, such as to 1 ms steps.

Inputs

An input to a neuron model may include Dirac delta functions, such as inputs as currents, or conductance-based inputs. In the latter case, the contribution to a neuron state may be continuous or state-dependent.

Simplified Circuit to Produce Programmable Probability Distribution Function of Pseudo-Random Numbers for Filtering Neuron Spikes In an Application Specific Integrated Circuit (ASIC) design, generation of a sequence of random numbers with a specific, non-uniform distribution of values can be difficult to implement. While Linear Feedback Shift Registers (LFSRs) can produce uniformly distributed numbers (and are well characterized), they cannot directly produce sequences of numbers with probabilistic distribution. Typical implementations require the use of area and power-intensive multipliers and filters subsequent to the LFSRs.

Certain aspects of the present disclosure support a simpler, smaller, and lower-power circuit than that typically used. It can be programmed to produce any of a variety of non-uniformly distributed sequences of numbers. These sequences can approximate true probabilistic distributions, but maintain sufficient pseudo-randomness to still be considered random in a probabilistic sense.

According to certain aspects of the present disclosure, the presented circuit can be an integral part of a filter block within a visual cortex portion of an ASIC circuitry that emulates an artificial nervous system, such as the artificial nervous system 100 illustrated in FIG. 1. The presented circuit for producing programmable probability distribution function of pseudo-random numbers may be utilized for filtering (dropping and passing) neuron spikes.

Probabilistic Algorithm—Simplified Programmable Probability Density Function

The method based on simplified programmable probability density function (PDF) may produce a burst-length coded sequence indicating "length until next drop" as well as "drop length". An address of the next fetch can be incremented appropriately "until the next drop", and then the "drop length" can be added as a skip to the next address.

Figure 5:
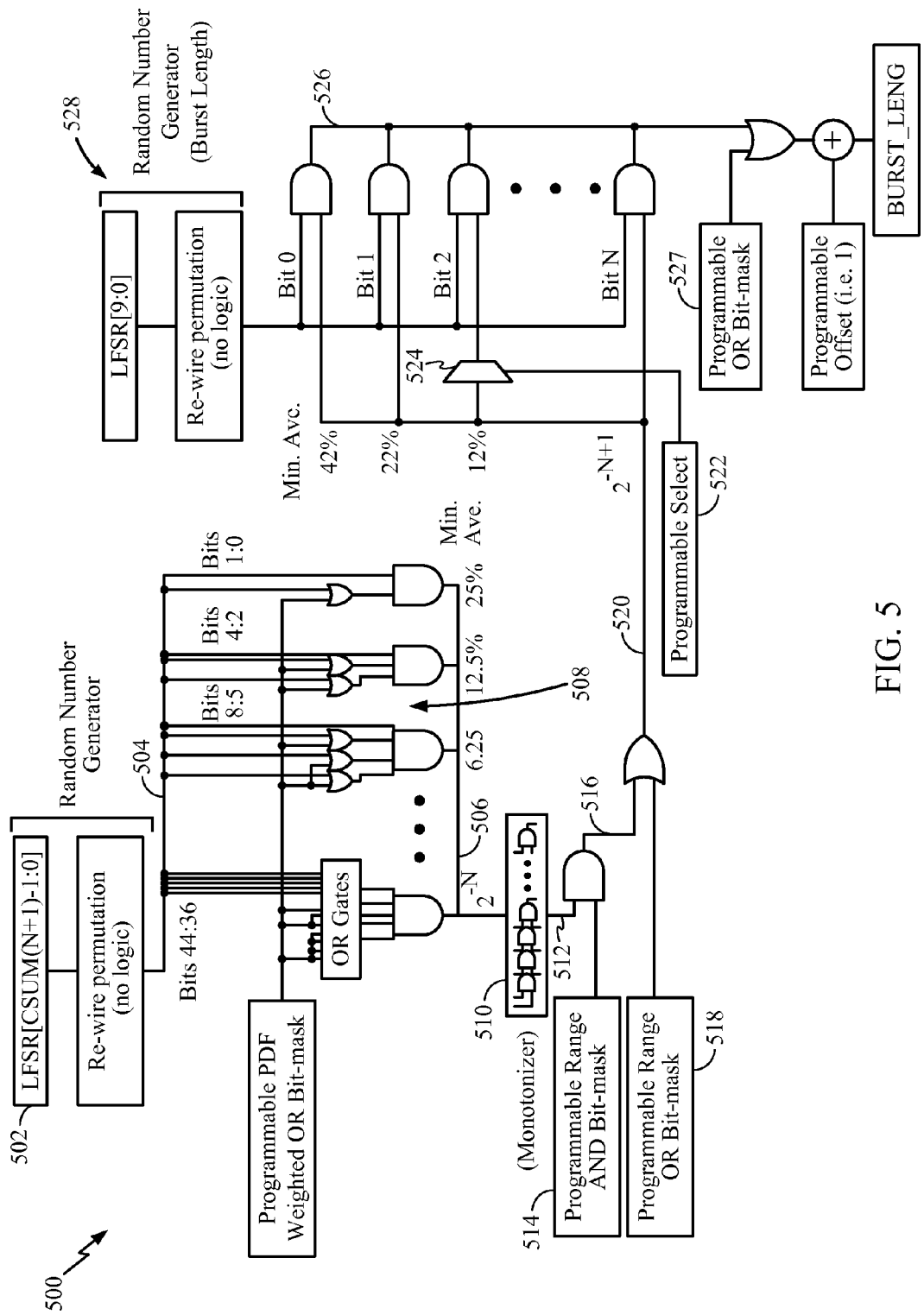
FIG. 5 illustrates an example simplified programmable probability density function (PDF) circuit block diagram, in accordance with certain aspects of the present disclosure.

FIG. 5 illustrates an example block diagram 500 of implementation that may allow significant programmability to the PDF profile while using a minimum of gates. The PDF can be adjusted from generating a completely uniform distribution of numbers to one with very low variance. In contrast to the brute force probabilistic approach, in this implementation not even one comparator is used.

Given the desire to generate a range of numbers between 0 and $2^N-1$, or N output bits, a Linear Feedback Shift Register (LFSR) 502 whose length is the cumulative summation (CSUM) of N+1 down to 0 (e.g., for N=4, the CSUM=4+3+2+1=10) is implemented to generate a sequence of random numbers. The LFSR 502 can either produce one new bit per clock cycle, or many for less correlated operation. A varying number of bits 504 from the LFSR 502 may be ANDed together to form an N-bit word 506, where the LSB may use the least number of ANDed together LFSR bits, and the MSB may use the most ANDed together bits. While a linearly increasing number of ANDs 508 per output bit is illustrated in FIG. 5, lower variance limits of the PDF can be achieved by increasing the number of ANDs even more.

Figure 6A:
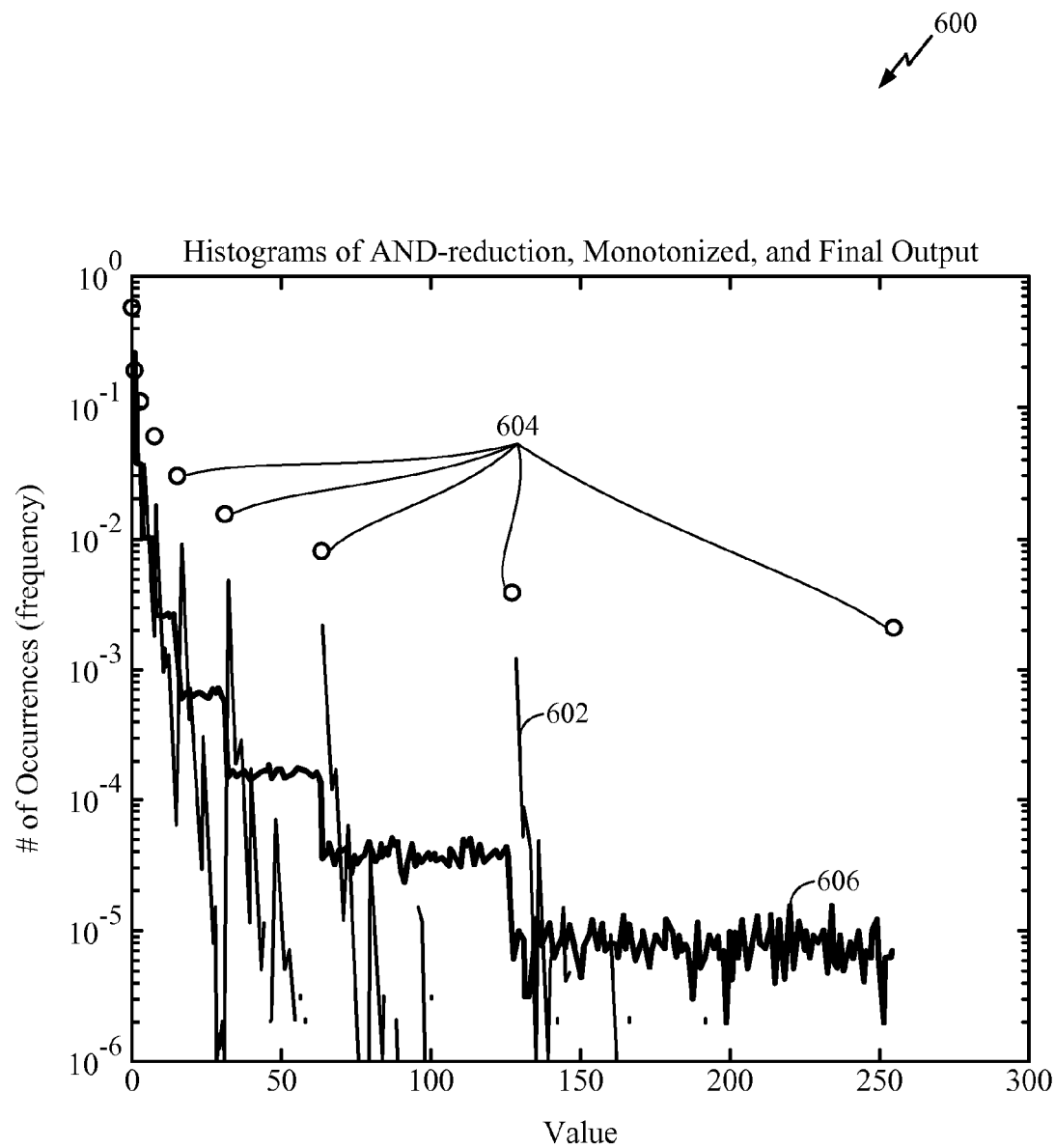
FIGS. 6A-6D illustrate examples of graphs of histograms of random generated sequences in accordance with certain aspects of the present disclosure.

The PDF of the output of this first LFSR 502 plus the AND reductions (N-bit word 506) is illustrated by a line 602 in a graph 600 in FIG. 6A. As is, this is not a very useful distribution. However, these values can be passed through a cascade of OR gates 510, from MSB to LSB, to produce the PDF illustrated by circles 604. Essentially, this cascaded OR operation integrates octave ranges and assigns them to a single value.

Using this value (i.e., a value 512 in FIG. 5) as a bit-mask for a separate LFSR's uniformly distributed output may provide a PDF approximating a normal distribution, illustrated by a line 606 in the graph 600 in FIG. 6A. As shown in the block diagram 500 in FIG. 5, without any bitmasks to modify any signals, the PDF of bits 506 in FIG. 5 has mean of 3.9175.

Figure 6B:
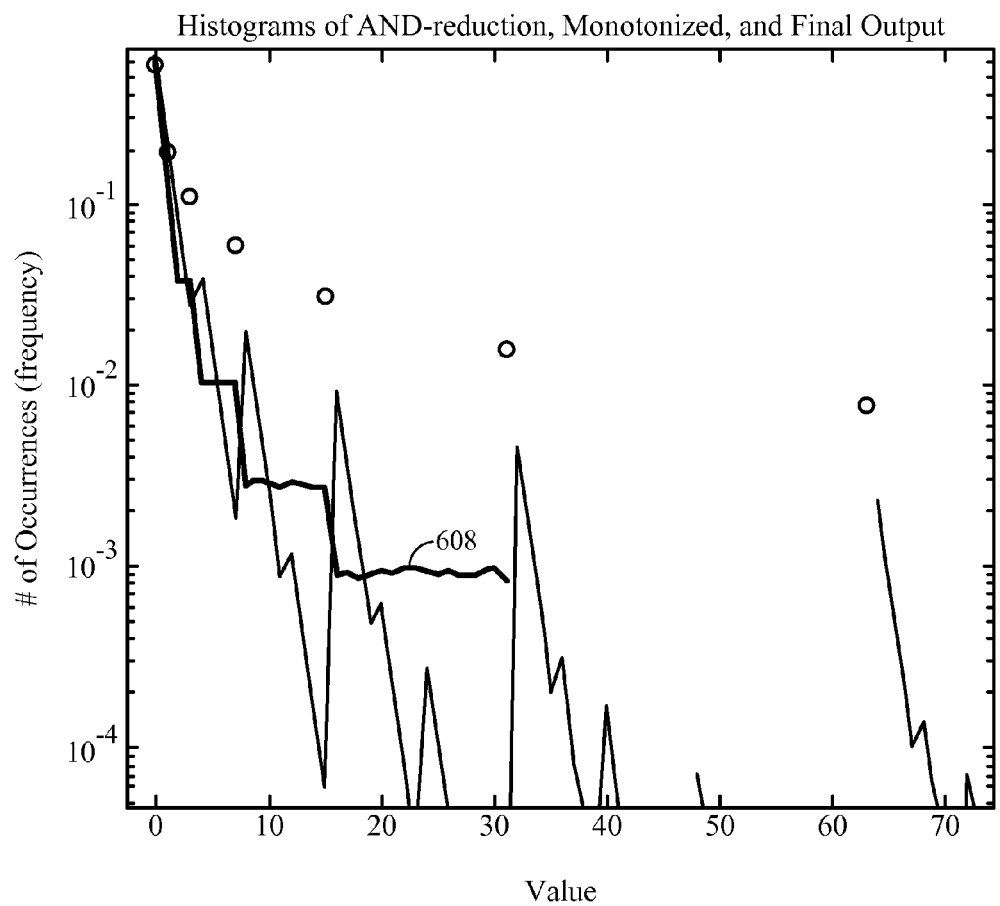

High values in the distribution 606 in FIG. 6A can be eliminated by utilizing the AND-bitmask 514 illustrated in FIG. 5. For example, setting a value of '0x1F' may limit output values to 0 to 31. This is illustrated in FIG. 6B, line 608, that shows range limited sequence of numbers (bits 516 in FIG. 5).

Figure 6C:
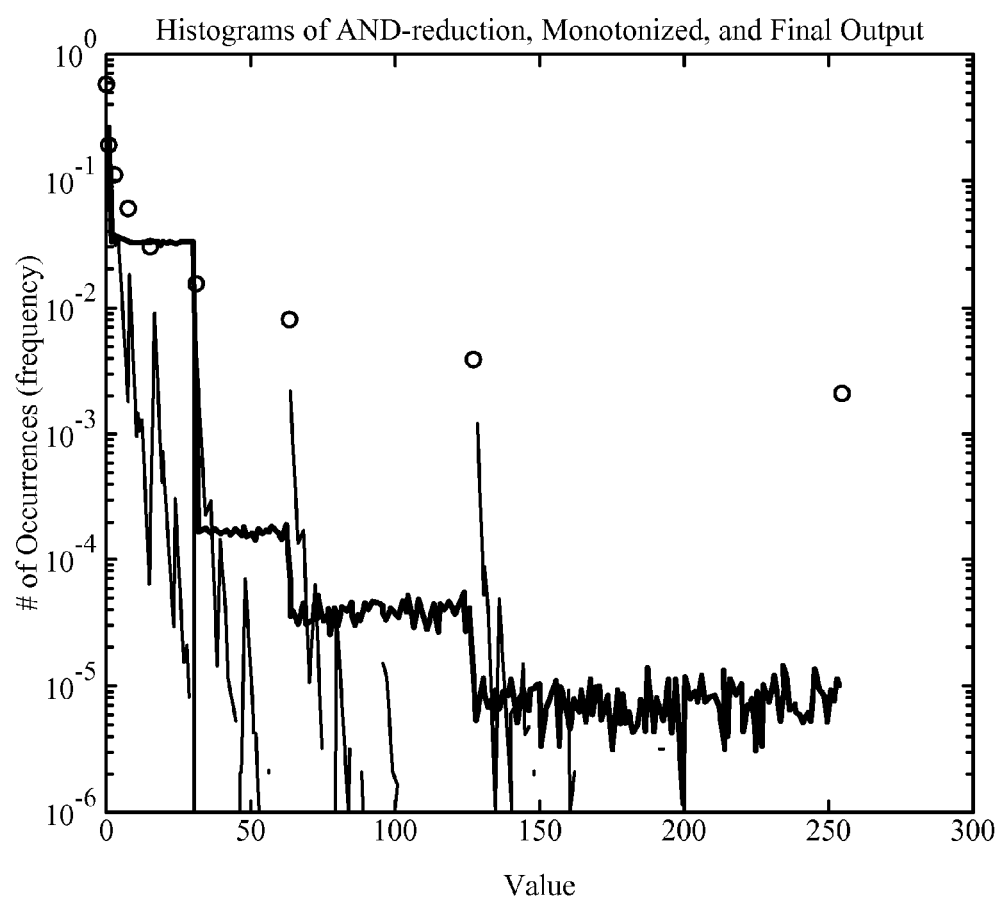

Low-value portions of the PDF 606 in FIG. 6A can be flattened (whitened) through higher ranges using the OR bitmask 518 illustrated in FIG. 5 applied to the output of the first LFSR in FIG. 5. FIG. 6C illustrates an example graph with flattened (whitened) low-value portions of the PDF of numbers (bits) 520 illustrated in FIG. 5.

Figure 6D:
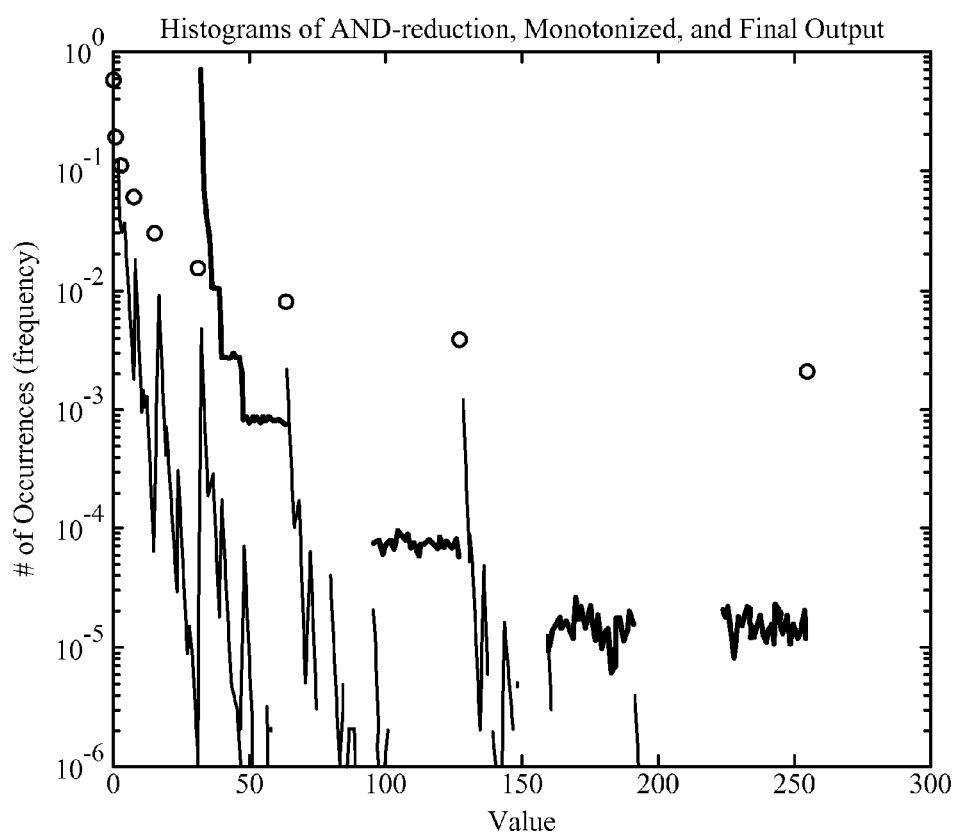

The output OR mask 527 in FIG. 5 may force ranges of values. For example, being set to '0x20' (assuming an 8-bit output value), the PDF would only contain values from 0x20 to 0xFF, although a pattern of intermediate values would also be missing. Therefore, the PDF would comprise [0x20:0x3F, 0x60:0x7F, 0xA0:0xBF, 0xE0:0xFF]. It should be noted that there would still be a normal distribution envelope to the resulting PDF, as illustrated in FIG. 6D showing range limited sequence. It should be also noted that it may not necessarily be desirable to eliminate ranges, especially low-numbered ranges.

The block diagram 500 in FIG. 5 also illustrates a "Programmable Select" register 522 driving a multiplexor 524. This logic decouples the N-bit output 520 of the first stage from the N-bit (final) output 526 of the second LFSR 528. One could increase the number of output bits (e.g., from N to N+2), allowing higher-bits to use one of various probabilities. This may allow increasing dynamic range of the output without growing the LFSR 502 or AND-reduction gates 508. Control at this level may help fine tune drop probabilities (i.e., probabilities of dropping spikes in an artificial nervous system) with resolution below 1%.

Alternate Implementations and Tradeoffs

Bandwidth Reduction—Brute Force Design

Figure 7:
FIG. 7 illustrates an example of number of comparisons per clock cycle to support given drop rates associated with neuron spikes in accordance with certain aspects of the present disclosure.

The most straightforward approach for bandwidth reduction (i.e., reduction of spikes) can be to calculate a spike drop percentage to compare against a pseudo-random sequence representing 0 to 100% for each individual spike. When the random number exceeds the drop percentage, a neuron spike is passed. To ensure that the CLS Fetch Manager maintains near 100% bandwidth, the SNS filter may need to send on one spike per clock (or more) on average. Therefore, to support a 50% spike drop rate, at least two drop probability checks may need to be performed per clock; for 90% spike drop rate, 10 comparisons may be needed; for 99% spike drop rate, 100 comparisons may be needed. This is illustrated in table 700 in FIG. 7.

Figure 8:
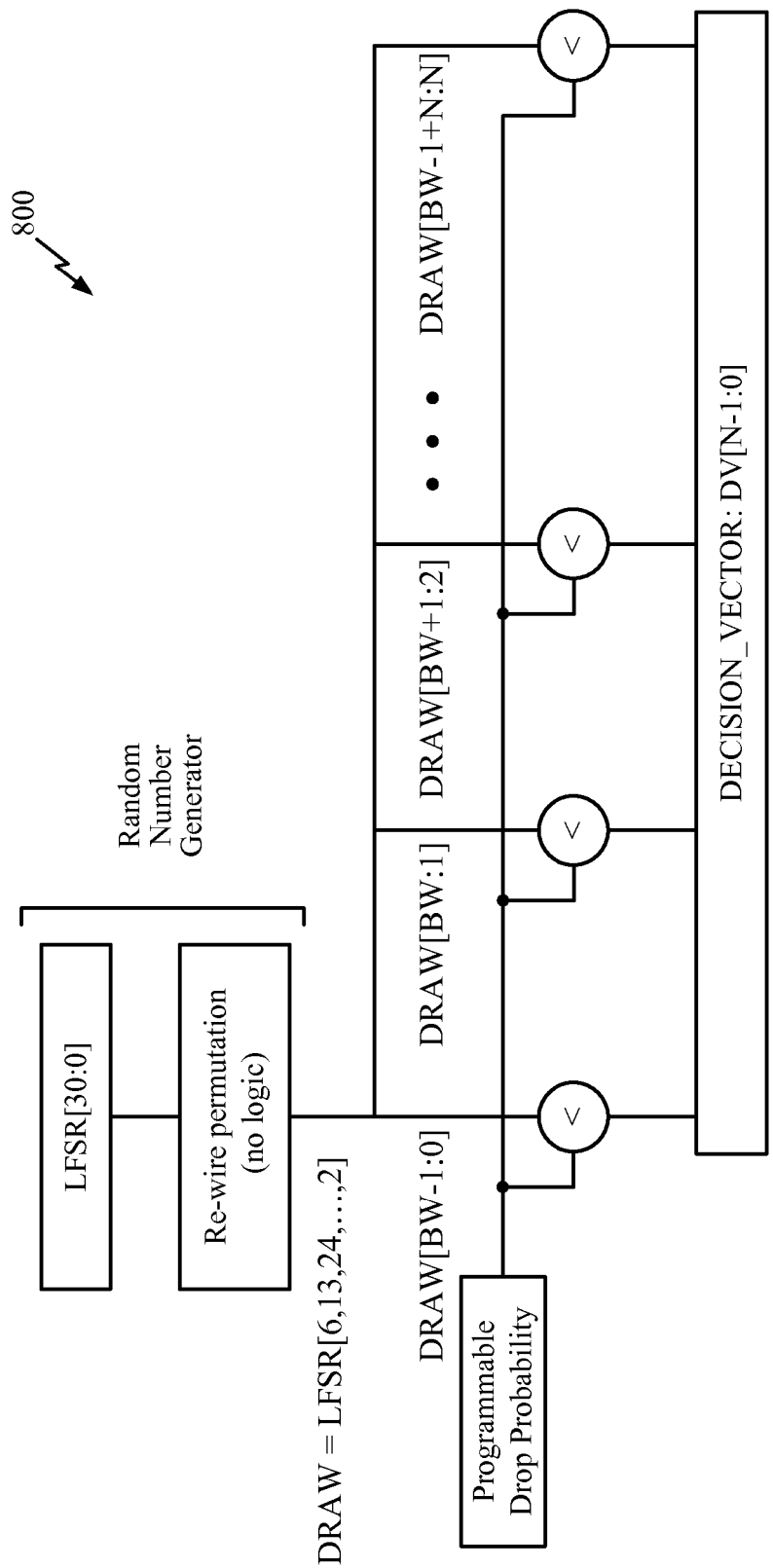
FIG. 8 illustrates an example block diagram of drop probability comparison to random number in accordance with certain aspects of the present disclosure.

An example block diagram 800 in FIG. 8 illustrates N parallel comparisons. For comparison bit-width (BW), drop probably resolution is $2^{-BW}$. For example, 8-bit comparisons provide $2^{-8}$=0.4% resolution; 10-bit comparisons provide 0.1% resolution.

LFSRs configured to generate a sequence of random numbers can be simple to implement. They can be easily modified to generate multiple, consecutive words in the sequence within a single clock cycle. This can become complicated when a code word is dependent on state bits not yet computed, and thus a look-ahead' type of logic evaluation may need to be performed. Complicated look-ahead can be avoided by choosing a polynomial whose lowest order term is still higher than the number of pseudo-random words to be generated each cycle. For example, the 31-bit LFSR can be configured which XNORs bits 27 and 30 may allow 28 code words to be generated each clock without adding any look-ahead. On the other hand, the 32-bit LFSR can be configured which XNORs bits 31, 21, 1, and 0 can only produce the next code word without using that result for subsequent code words. This can have implications to timing closure for large number of simultaneous words. Alternately, different permutations of bits can be utilized in the LFSR to generate additional words from the same LFSR state. In fact, any value taken from an LFSR should be permuted to avoid the correlation that occurs from shifted versions of bursts of 1's and 0's. Further, according to certain aspects of the present disclosure, more complex LFSR-based code generators, such as, but not limited to, Gold Code Generators (GCGs) may be utilized in place of simple LFSRs. By using the GCGs, correlation between generated code words may be reduced or fully avoided.

Figure 9:
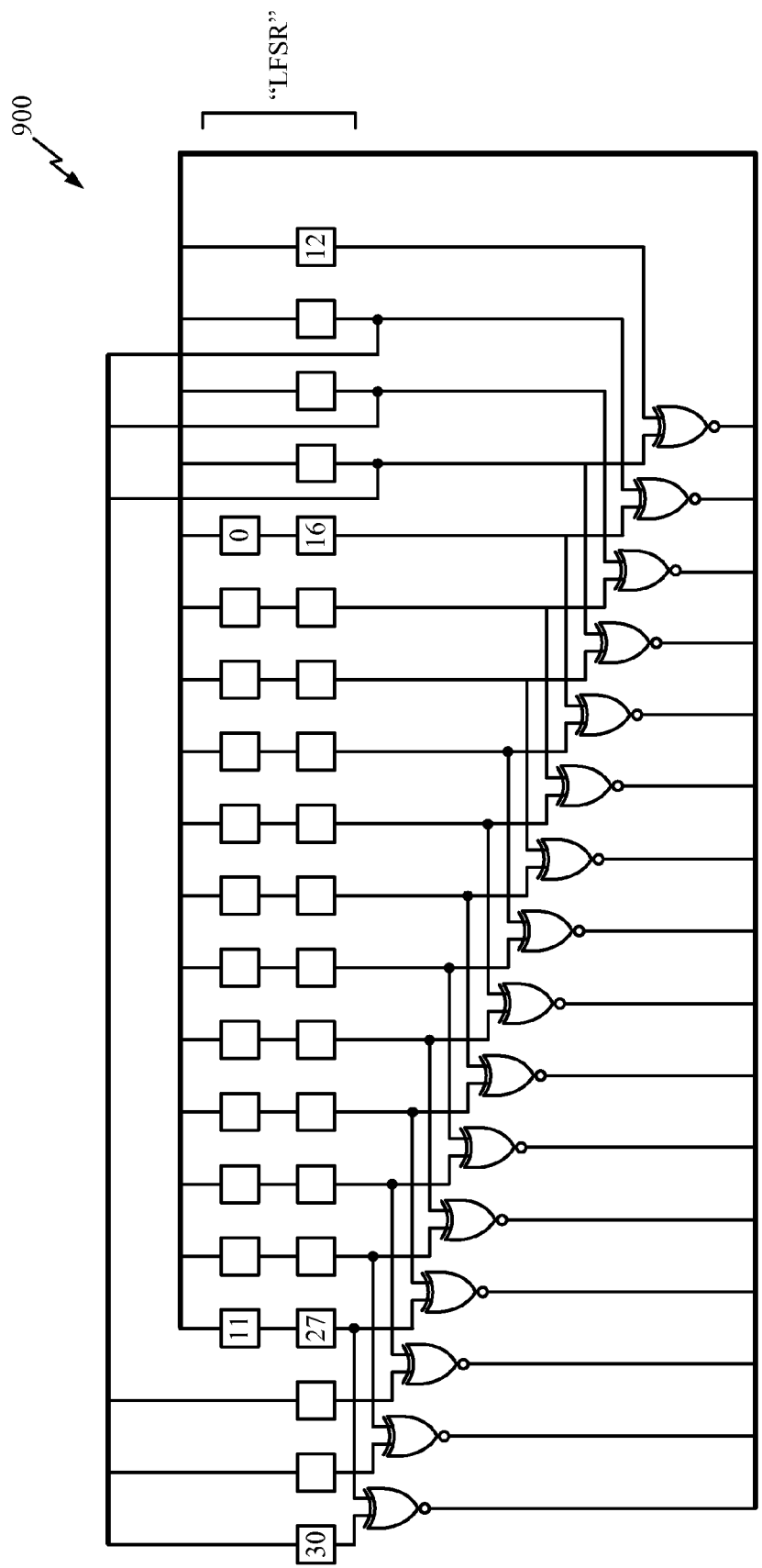
FIG. 9 illustrates an example block diagram of Linear Feedback Shift Register (LFSR) generating 16 words per clock, in accordance with certain aspects of the present disclosure.

FIG. 9 illustrated an example block diagram 900 of 31-bit LFSR that may generate 16 words per clock cycle in accordance with certain aspects of the present disclosure. As illustrated in FIG. 9, XNORs bits 27 and 30 may allow 16 code words to be generated each clock without adding any look-ahead.

The most logically-simple method of converting the Decision-Vector (DV) of comparison results (e.g., the DV illustrated in the block diagram 800 in FIG. 8) to address/length output words can be to produce a series of words with length=1 and address field some base value plus the index to each of the comparison results indicating 'pass' (i.e., do not drop). This method can be referred to as "Length-1 Passes". It may produce the highest number of spike lists (albeit each of length 1), which could impact the system if there is any overhead per word downstream. Additionally, this could cause slightly higher actual spike drop rates due to dead time downstream if all comparisons indicate a drop for that clock cycle.

Alternatively, it would be beneficial to maintain some list efficiency by determining the length of bursts of passes in the DV, allowing the length in the output word to be greater than one. This method can be referred to as "Burst-Length Passes". It would allow higher than one passed spike per clock cycle, all but eliminating the chances of dead time downstream.

In an aspect of the present disclosure, "Burst-Length Passes" can be implemented based upon a variety of bit-level modifications to the decision vector. If 'N' represents the number of comparisons per clock (from the table 700 in FIG. 7), then the DV would be defined as DV[N−1:0], while a '1' indicates drop and 0 indicates pass. Also, the LSB of the DV may represent the decision at the beginning of the spike list while the MSB is later/lower. Then, any sequence of '01' bits in the DV word would flag the beginning of a burst, and '10' indicates the end. Thus, $$\text{BURST\_STARTS} = \{DV[N-2:0], 1'b0\} \& (!DV[N-1:0]); \quad (1)$$

and $$\text{BURST\_ENDS} = !DV[N-1:0] \& \{DV[N-2:0], 1'b0\}; \quad (2)$$

One can concatenate 1'b0 below the LSB representing the completion of any prior bursts since there is no carry over from one set of N comparisons to the next.

From these terms, the offset to the address of the first burst can be calculated using:

$$\text{BURST\_ADDR\_OFST} = \text{SUM}(\text{CASCADED\_AND}(!\text{BURST\_STARTS})); \quad (3)$$

where each bit resulting from the CASCADED_AND function is the AND-reduction of the sub-range of all input bits below itself (i.e., result[bit]=AND_REDUCED(input[bit:0])). In general, the result of the CASCADED_AND function can be a thermometer-coded version of the address, and SUM converts to numeric encoding.

A similar calculation provides:

$$\text{BURST\_END\_OFST} = \text{SUM}(\text{CASCADED\_AND}(!\text{BURST\_ENDS})); \quad (4)$$

However, rather than taking this sum from which subtracting the address produced the length, one can bitwise XOR the results of the two CASCASED_AND functions and avoid the subtraction to calculate:

$$\text{BURST\_LENGTH} = \text{SUM}(\text{CASCADED\_AND}(!\text{BURST\_STARTS})\char`\^\text{CASCADED\_AND}(!\text{BURST\_ENDS})); \quad (5)$$

Having an address and length modified by the spike drop rate, the CLS fields of the output word can be modified to indicate a limited-length burst from the proper base address plus burst address offset. Since a single DV can contain multiple bursts (e.g., bursts of neuron spikes), it may be needed to search for the next burst. Since an output rate is limited to one spike list per clock cycle, it may be needed to only eliminate the prior burst in the DV:

$$\text{DV\_NEXT} = DV|(\{\text{CASCADED\_AND}(!\text{BURST\_ENDS}), 1'b1\}); \quad (6)$$

In an aspect, it would be possible to concatenate a 1'b1 at the end to align the bits meaningfully. AND_REDUCED (DV_NEXT) equal to 1 would indicate there are no further bursts, thus it would instead load the next set of comparison results (fresh DV) and advance the LFSR state.

Non-optimized implementation of the above logic (especially the 'CASCADED' functions) may appear to lead to a high number of logic-levels. However, tools can add look-ahead-style optimizations. Alternately, a register stage just before or after these functions can improve timing, if necessary.

Figure 10A:
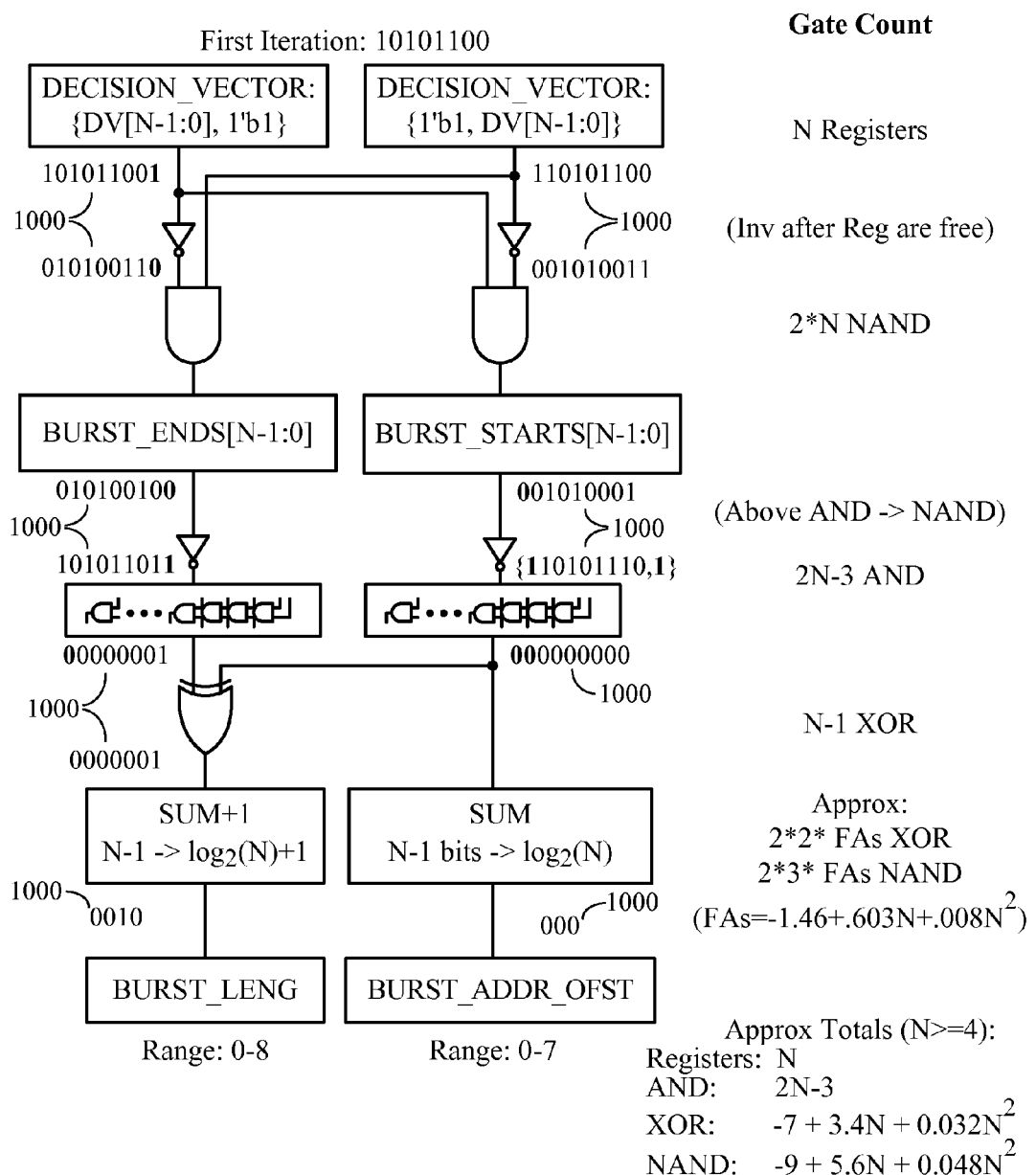
FIGS. 10A-10B illustrate examples of logics for burst-length passes of neuron spikes in accordance with certain aspects of the present disclosure.
Figure 10B:
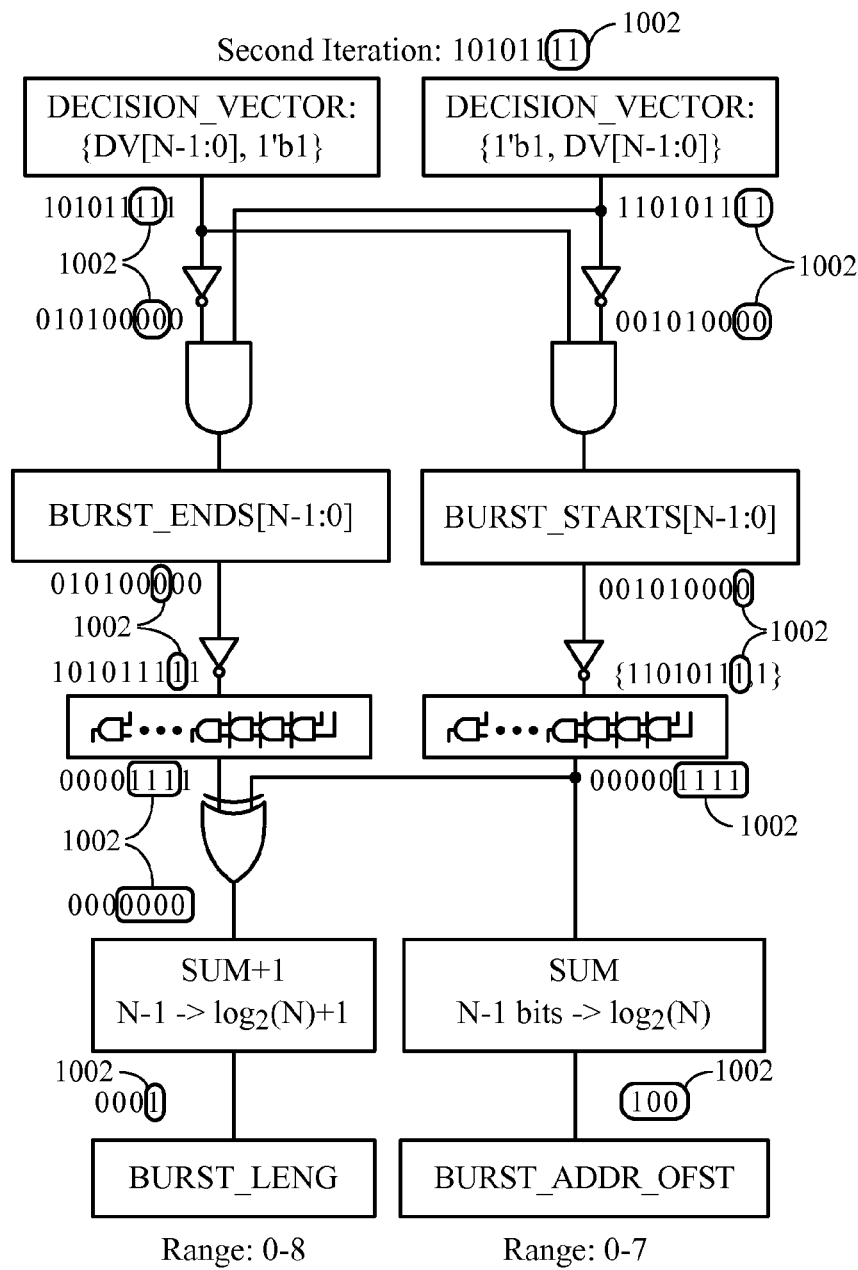

FIGS. 10A-10B illustrate the logic implementation for two iterations of the same LFSR value. Expected values using an example DV=8'b10101100 is included to facilitate the illustration. Not allowing single bursts to cross multiple clock cycles (i.e., no length accumulation) can be modeled by concatenating a 'drop' at both the beginning and end of the DV. Since these bits serve only to facilitate the logic below, and the logic synthesis tool will propagate constants, the texts 1000 in the diagram in FIG. 10A indicate the actual information-carrying portion of the values.

FIG. 10B illustrates the same hardware on the next clock cycle, but processing the next burst. The first burst indication has been removed from the DV so that the second iteration may start. Texts 1002 signify values that changed after the DV was updated.

Figure 11:
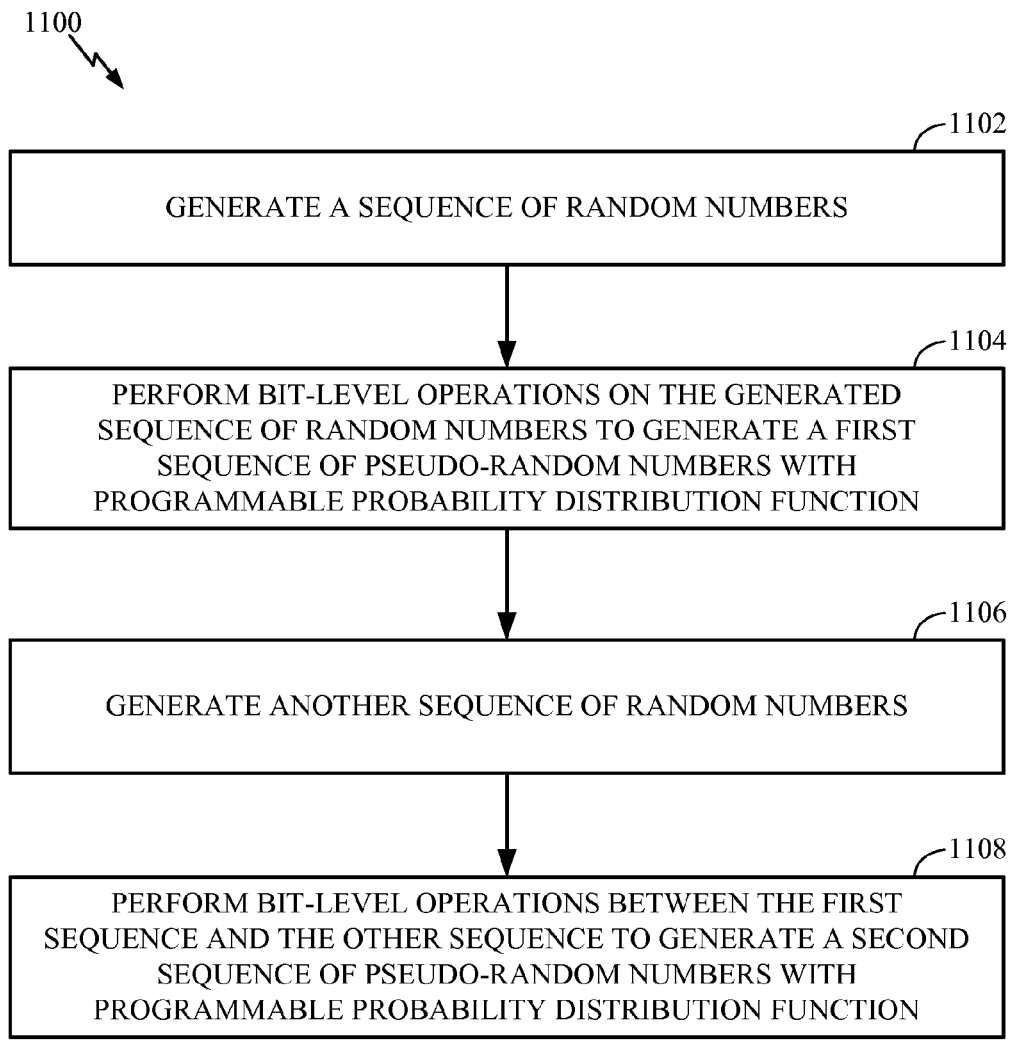
FIG. 11 is a flow diagram of example operations for operating an artificial nervous system, in accordance with certain aspects of the present disclosure.

FIG. 11 is a flow diagram of example operations 1100 for operating an artificial nervous system in accordance with certain aspects of the present disclosure. The operations 1100 may be performed in hardware (e.g., by one or more neural processing units, such as a neuromorphic processor), in software, or in firmware. The artificial nervous system may be modeled on any of various biological or imaginary nervous systems, such as a visual nervous system, an auditory nervous system, the hippocampus, and so on.

The operations 1100 may begin, at 1102, by generating a sequence of random numbers. At 1104, bit-level operations may be performed on the generated sequence of random numbers to generate a first sequence of pseudo-random numbers with programmable probability distribution function (PDF). At 1106, another sequence of random numbers may be generated. At 1108, bit-level operations may be performed between the first sequence and the other sequence to generate a second sequence of pseudo-random numbers with programmable. Certain aspects of the present disclosure support dropping spikes associated with artificial neurons of an artificial nervous system (e.g., the artificial nervous system 100 from FIG. 1) in accordance with the PDF of the second sequence of pseudo-random numbers, i.e., based on the PDF of the bit sequence 526 in the block diagram 500 from FIG. 5.

Figure 12:
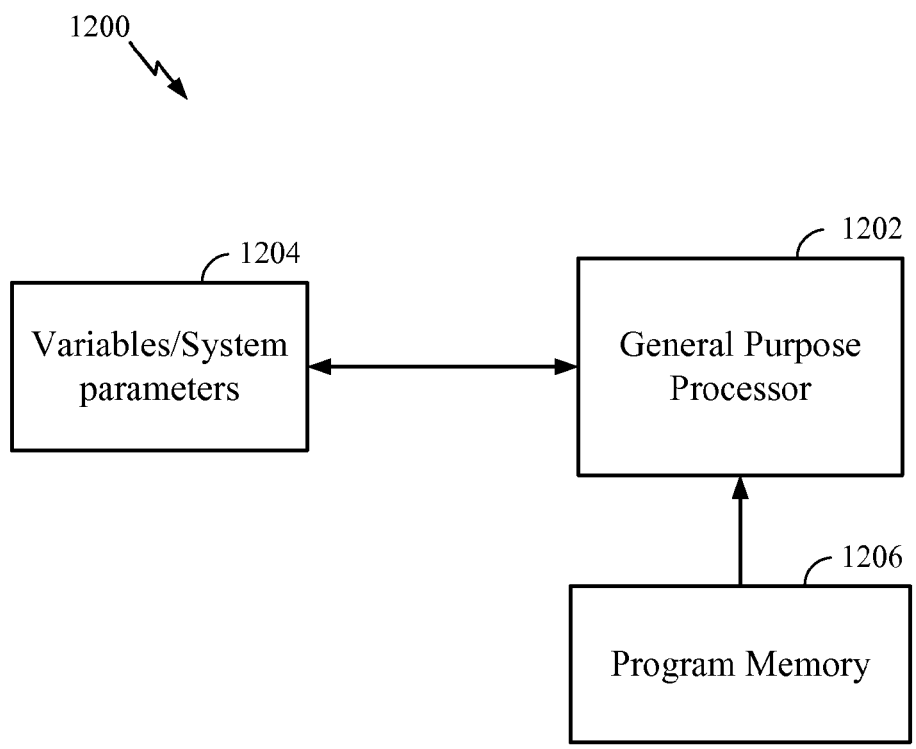
FIG. 12 illustrates an example implementation for operating an artificial nervous system using a general-purpose processor, in accordance with certain aspects of the present disclosure.

FIG. 12 illustrates an example block diagram 1200 of the aforementioned method for operating an artificial nervous system using a general-purpose processor 1202 in accordance with certain aspects of the present disclosure. Variables (neural signals), synaptic weights, and/or system parameters associated with a computational network (neural network) may be stored in a memory block 1204, while instructions related executed at the general-purpose processor 1202 may be loaded from a program memory 1206. In an aspect of the present disclosure, the instructions loaded into the general-purpose processor 1202 may comprise code for generating a sequence of random numbers, for performing bit-level operations on the generated sequence of random numbers to generate a first sequence of pseudo-random numbers with programmable probability distribution function (PDF), for generating another sequence of random numbers and for performing bit-level operations between the first sequence and the other sequence to generate a second sequence of pseudo-random numbers with programmable PDF.

Figure 13:
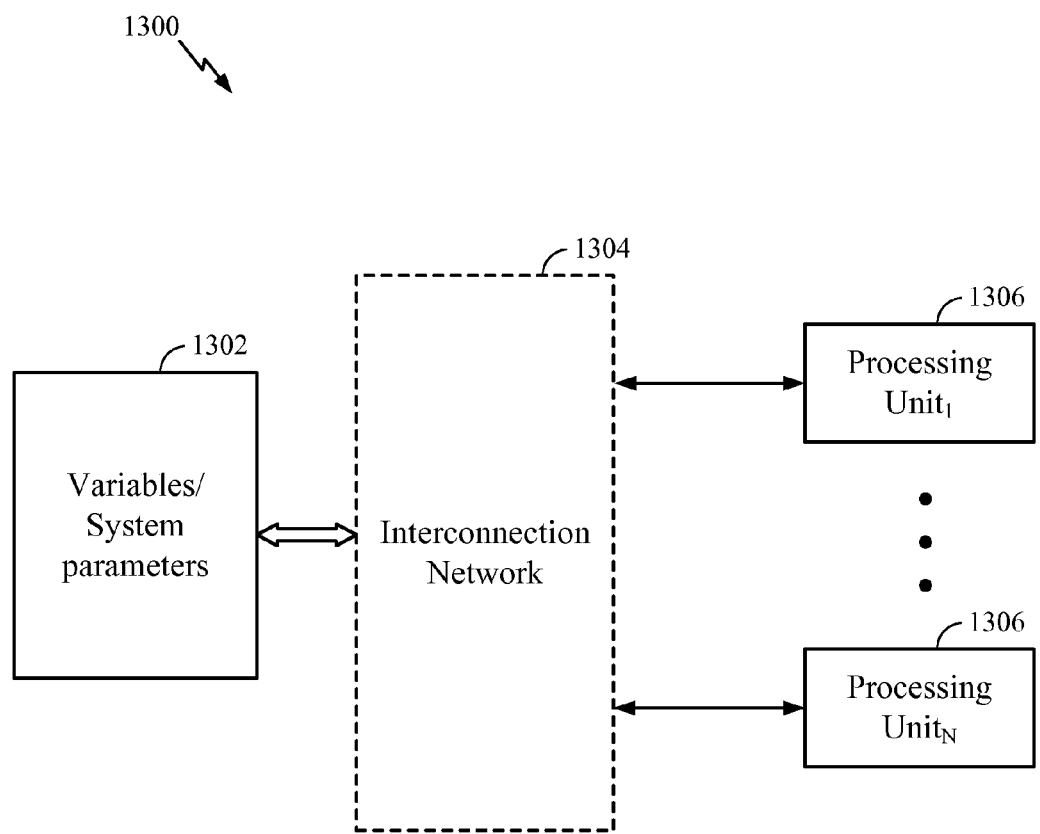
FIG. 13 illustrates an example implementation for operating an artificial nervous system where a memory may be interfaced with individual distributed processing units, in accordance with certain aspects of the present disclosure.

FIG. 13 illustrates an example block diagram 1300 of the aforementioned method for operating an artificial nervous system where a memory 1302 can be interfaced via an interconnection network 1304 with individual (distributed) processing units (neural processors) 1306 of a computational network (neural network) in accordance with certain aspects of the present disclosure. Variables (neural signals), synaptic weights, and/or system parameters associated with the computational network (neural network) may be stored in the memory 1302, and may be loaded from the memory 1302 via connection(s) of the interconnection network 1304 into each processing unit (neural processor) 1306. In an aspect of the present disclosure, the processing unit 1306 may be configured to generate a sequence of random numbers, to perform bit-level operations on the generated sequence of random numbers to generate a first sequence of pseudo-random numbers with programmable probability distribution function (PDF), to generate another sequence of random numbers, and to perform bit-level operations between the first sequence and the other sequence to generate a second sequence of pseudo-random numbers with programmable PDF.

Figure 14:
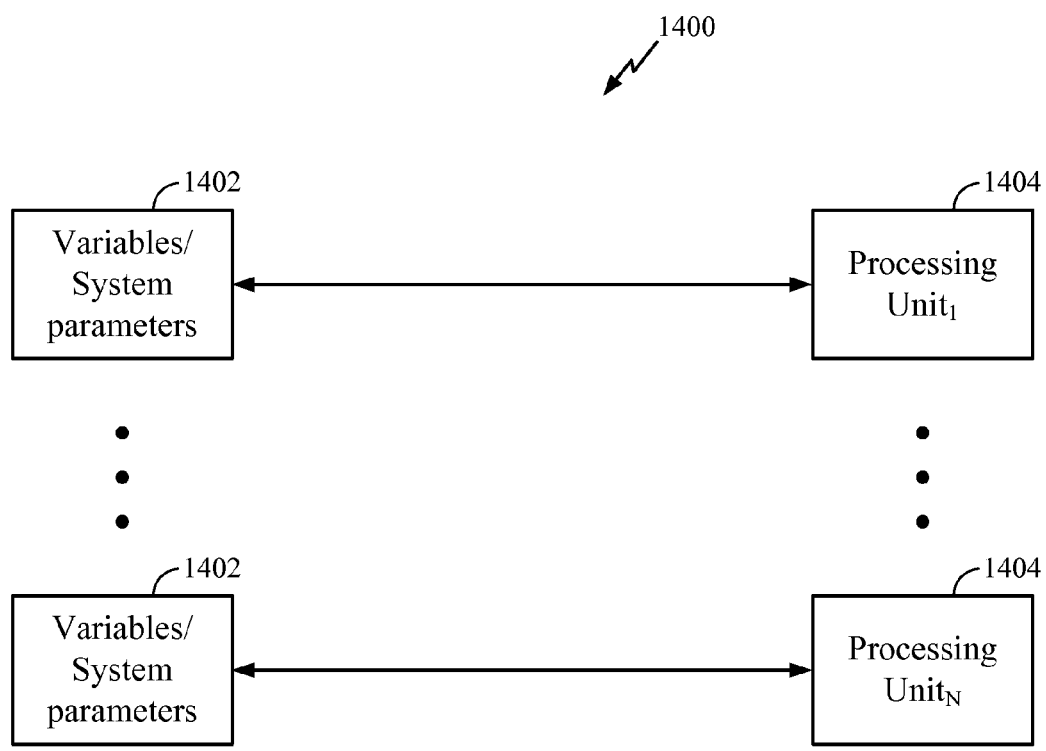
FIG. 14 illustrates an example implementation for operating an artificial nervous system based on distributed memories and distributed processing units, in accordance with certain aspects of the present disclosure.

FIG. 14 illustrates an example block diagram 1400 of the aforementioned method for operating an artificial nervous system based on distributed weight memories 1402 and distributed processing units (neural processors) 1404 in accordance with certain aspects of the present disclosure. As illustrated in FIG. 14, one memory bank 1402 may be directly interfaced with one processing unit 1404 of a computational network (neural network), wherein that memory bank 1402 may store variables (neural signals), synaptic weights, and/or system parameters associated with that processing unit (neural processor) 1404. In an aspect of the present disclosure, the processing unit(s) 1404 may be configured to generate a sequence of random numbers, to perform bit-level operations on the generated sequence of random numbers to generate a first sequence of pseudo-random numbers with programmable probability distribution function (PDF), to generate another sequence of random numbers, and to perform bit-level operations between the first sequence and the other sequence to generate a second sequence of pseudo-random numbers with programmable PDF.

Figure 15:
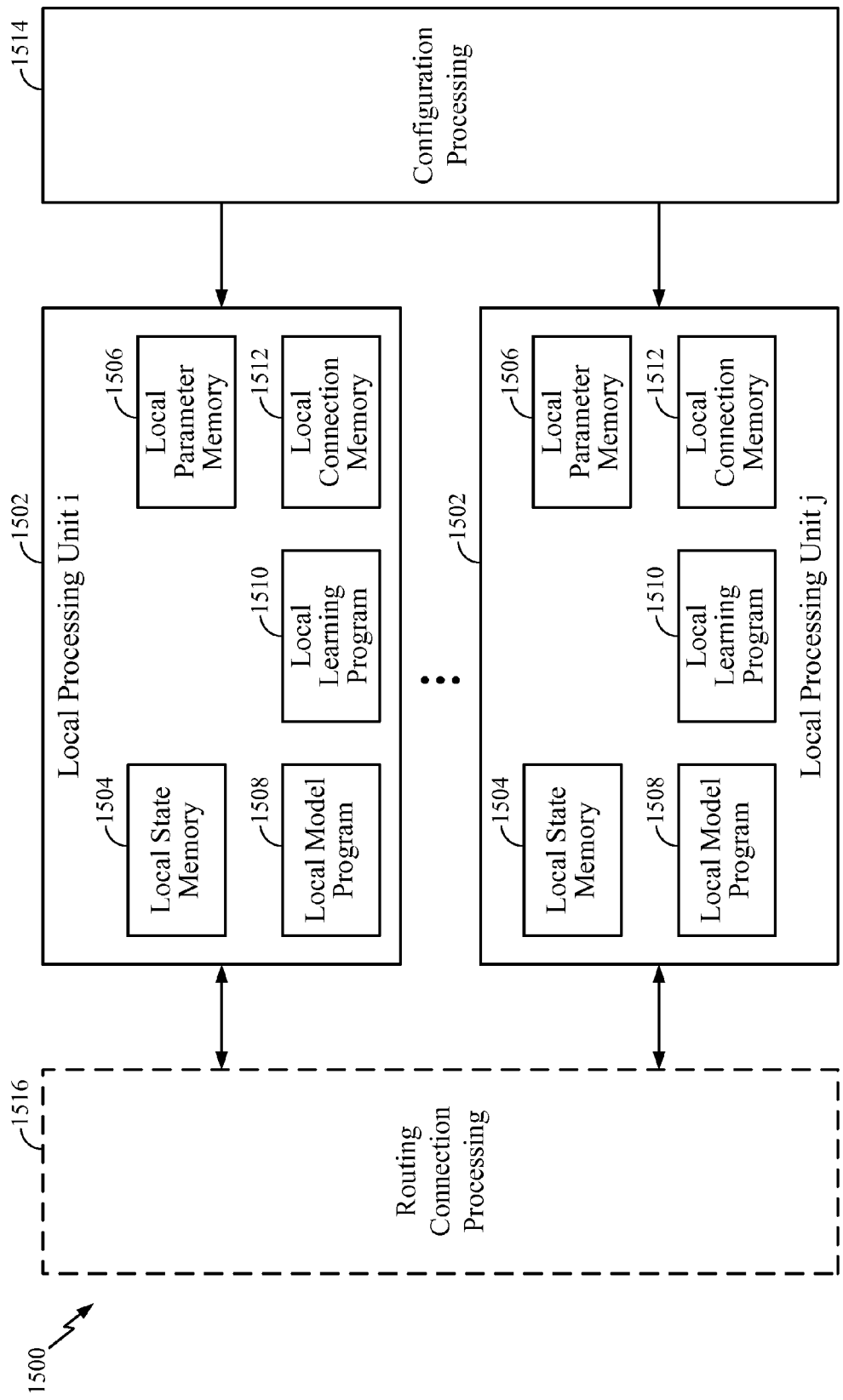
FIG. 15 illustrates an example implementation of a neural network in accordance with certain aspects of the present disclosure.

FIG. 15 illustrates an example implementation of a neural network 1500 in accordance with certain aspects of the present disclosure. As illustrated in FIG. 15, the neural network 1500 may comprise a plurality of local processing units 1502 that may perform various operations of methods described above. Each processing unit 1502 may comprise a local state memory 1504 and a local parameter memory 1506 that store parameters of the neural network. In addition, the processing unit 1502 may comprise a memory 1508 with a local (neuron) model program, a memory 1510 with a local learning program, and a local connection memory 1512. Furthermore, as illustrated in FIG. 15, each local processing unit 1502 may be interfaced with a unit 1514 for configuration processing that may provide configuration for local memories of the local processing unit, and with routing connection processing elements 1516 that provide routing between the local processing units 1502.

According to certain aspects of the present disclosure, each local processing unit 1502 may be configured to determine parameters of the neural network based upon desired one or more functional features of the neural network, and develop the one or more functional features towards the desired functional features as the determined parameters are further adapted, tuned and updated.

Figure 11A:
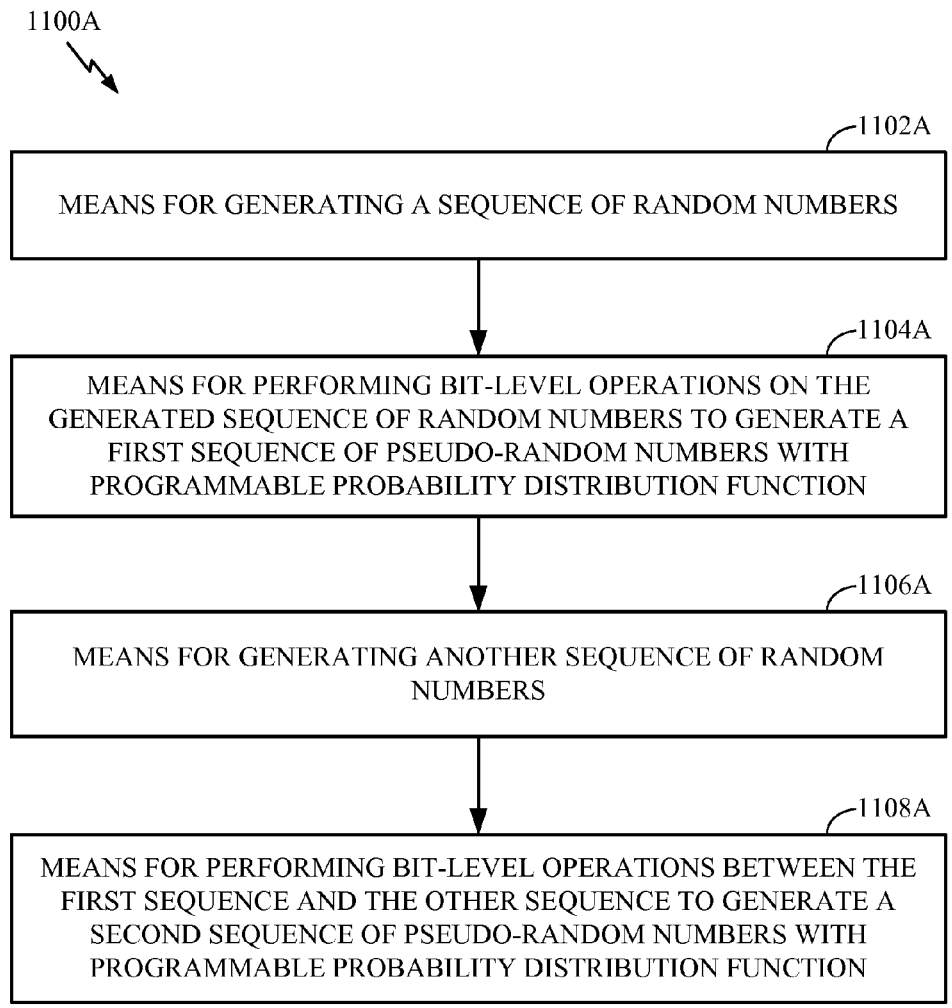
FIG. 11A illustrates example means capable of performing the operations shown in FIG. 11.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, the various operations may be performed by one or more of the various processors shown in FIGS. 12-15. Generally, where there are operations illustrated in figures, those operations may have corresponding counterpart means-plus-function components with similar numbering. For example, operations 1100 illustrated in FIG. 11 correspond to means 1100A illustrated in FIG. 11A.

For example, means for displaying may include a display (e.g., a monitor, flat screen, touch screen, and the like), a printer, or any other suitable means for outputting data for visual depiction (e.g., a table, chart, or graph). Means for processing, means for receiving, means for tracking, means for adjusting, means for updating, or means for determining may comprise a processing system, which may include one or more processors or processing units. Means for sensing may include a sensor. Means for storing may include a memory or any other suitable storage device (e.g., RAM), which may be accessed by the processing system.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for reducing spikes in an artificial nervous system, the method comprising:
generating, by an apparatus, a sequence of random numbers;
performing, by the apparatus, bit-level operations on the generated sequence of random numbers to generate a first sequence of pseudo-random numbers with a programmable probability distribution function (PDF), wherein performing the bit-level operations on the generated sequence of random numbers comprises:
performing AND operation on bits of the sequence of random numbers;
passing the ANDed bits through a cascade of OR gates to obtain bit-mask values; and
applying the bit-mask values to bits of the sequence of random numbers to generate the first sequence of pseudo-random numbers with the programmable PDF;
generating, by the apparatus, another sequence of random numbers;
performing, by the apparatus, bit-level operations between the first sequence and the other sequence to generate a second sequence of pseudo-random numbers with a programmable PDF; and
dropping, by the apparatus, spikes associated with one or more artificial neurons of the artificial nervous system in accordance with the PDF of the second sequence of pseudo-random numbers.

2. The method of claim 1, wherein:
the sequence of random numbers is generated using first Linear Feedback Shift Registers (LFSRs), and
the other sequence of random numbers is generated using second LFSRs separate from the first LFSRs.

3. The method of claim 1, further comprising:
performing AND operation between the bits passed through the cascade of OR gates and a first bit-mask to obtain a range limited sequence of random numbers.

4. The method of claim 3, further comprising:
performing OR operation between bits of the range limited sequence and a second bit-mask to obtain another sequence of random numbers with a PDF having whitened low-value portions.

5. The method of claim 1, further comprising:
decoupling the first sequence from the second sequence using a controllable multiplexor.

6. The method of claim 5, further comprising:
performing bit-level operations using an output of the multiplexer, bits of the first sequence and bits of the other sequence to generate the second sequence of pseudo-random numbers with the programmable PDF.

7. The method of claim 1, further comprising:
performing OR operation between the second sequence of pseudo-random numbers and a bit-mask to adjust the programmable PDF of the second sequence.

8. The method of claim 1, wherein:
the sequence of random numbers is generated using a first Gold Code Generator, and
the other sequence of random numbers is generated using a second Gold Code Generator separate from the first Gold Code Generator.

9. An apparatus, comprising:
a first circuit configured to generate a sequence of random numbers;
a second circuit configured to perform bit-level operations on the generated sequence of random numbers to generate a first sequence of pseudo-random numbers with a programmable probability distribution function (PDF), wherein, to perform the bit-level operations on the generated sequence of random numbers, the second circuit is configured to:
perform AND operation on bits of the sequence of random numbers;
pass the ANDed bits through a cascade of OR gates to obtain bit-mask values; and
apply the bit-mask values to bits of the sequence of random numbers to generate the first sequence of pseudo-random numbers with the programmable PDF;
a third circuit configured to generate another sequence of random numbers;
a fourth circuit configured to perform bit-level operations between the first sequence and the other sequence to generate a second sequence of pseudo-random numbers with a programmable PDF; and
a fifth circuit configured to drop spikes associated with artificial neurons of an artificial nervous system comprising the apparatus in accordance with the PDF of the second sequence of Pseudo-random numbers.

10. The apparatus of claim 9, wherein:
the first circuit configured to generate the sequence of random numbers comprises first Linear Feedback Shift Registers (LFSRs), and
the third circuit configured to generate the other sequence of random numbers comprises second LFSRs separate from the first LFSRs.

11. The apparatus of claim 9, wherein the second circuit is further configured to:
perform AND operation between the bits passed through the cascade of OR gates and a first bit-mask to obtain a range limited sequence of random numbers.

12. The apparatus of claim 11, wherein the second circuit is further configured to:
perform OR operation between bits of the range limited sequence and a second bit-mask to obtain another sequence of random numbers with a PDF having whitened low-value portions.

13. The apparatus of claim 9, further comprising:
a controllable multiplexor configured to decouple the first sequence from the second sequence.

14. The apparatus of claim 13, wherein the fourth circuit is further configured to:
perform bit-level operations using an output of the multiplexer, bits of the first sequenc and bits of the other sequence to generate the second sequence of pseudo-random numbers with the programmable PDF.

15. The apparatus of claim 9, further comprising:
a fifth circuit configured to perform OR operation between the second sequence of pseudo-random numbers and a bit-mask to adjust the programmable PDF of the second sequence.

16. The apparatus of claim 9, wherein:
the first circuit configured to generate the sequence of random numbers comprises a first Gold Code Generator, and
the third circuit configured to generate the other sequence of random numbers comprises a second Gold Code Generator separate from the first Gold Code Generator.

17. An apparatus, comprising:
means for generating a sequence of random numbers;
means for performing bit-level operations on the generated sequence of random numbers to generate a first sequence of pseudo-random numbers with a programmable probability distribution function (PDF), wherein means for performing bit-level operations on the generated sequence of random numbers comprises:
means for performing AND operation on bits of the sequence of random numbers;
means for passing the ANDed bits through a cascade of OR gates to obtain bit-mask values; and
means for applying the bit-mask values to bits of the sequence of random numbers to generate the first sequence of pseudo-random numbers with the programmable PDF;
means for generating another sequence of random numbers;
means for performing bit-level operations between the first sequence and the other sequence to generate a second sequence of pseudo-random numbers with a programmable PDF; and
means for dropping spikes associated with artificial neurons of an artificial nervous system comprising the apparatus in accordance with the PDF of the second sequence of pseudo-random numbers.

18. The apparatus of claim 17, wherein:
the means for generating the sequence of random numbers comprises means for using first Linear Feedback Shift Registers (LFSRs), and
the means for generating the other sequence of random numbers comprises means for using second LFSRs separate from the first LFSRs.

19. The apparatus of claim 17, further comprising:
means for performing AND operation between the bits passed through the cascade of OR gates and a first bit-mask to obtain a range limited sequence of random numbers.

20. The apparatus of claim 19, further comprising:
means for performing OR operation between bits of the range limited sequence and a second bit-mask to obtain another sequence of random numbers with a PDF having whitened low-value portions.

21. The apparatus of claim 17, further comprising:
means for decoupling the first sequence from the second sequence using a controllable multiplexor.

22. The apparatus of claim 21, further comprising:
means for performing bit-level operations using an output of the multiplexer, bits of the first sequence and bits of the other sequence to generate the second sequence of pseudo-random numbers with the programmable PDF.

23. The apparatus of claim 17, further comprising:
means for performing OR operation between the second sequence of pseudo-random numbers and a bit-mask to adjust the programmable PDF of the second sequence.

24. The apparatus of claim 17, wherein:
the means for generating the sequence of random numbers comprises means for using a first Gold Code Generator, and
the means for generating the other sequence of random numbers comprises means for using a second Gold Code Generator separate from the first Gold Code Generator.

25. A non-transitory computer-readable medium having instructions executable to:
generate, by an apparatus, a sequence of random numbers;
perform, by the apparatus, bit-level operations on the generated sequence of random numbers to generate a first sequence of pseudo-random numbers with a programmable probability distribution function (PDF), wherein performing the bit-level operations on the generated sequence of random numbers comprises:
performing AND operation on bits of the sequence of random numbers;
passing the ANDed bits through a cascade of OR gates to obtain bit-mask values; and
applying the bit-mask values to bits of the sequence of random numbers to generate the first sequence of pseudo-random numbers with the programmable PDF;
generate, by the apparatus, another sequence of random numbers;
perform, by the apparatus, bit-level operations between the first sequence and the other sequence to generate a second sequence of pseudo-random numbers with a programmable PDF; and
drop spikes associated with artificial neurons of an artificial nervous system comprising the apparatus in accordance with the PDF of the second sequence of pseudo-random numbers.

26. The computer-readable medium of claim 25, wherein the computer-readable medium further comprising instructions executable to:

generate the sequence of random numbers by using first Linear Feedback Shift Registers (LFSRs), and
generate the other sequence of random numbers by using second LFSRs separate from the first LFSRs.

27. The computer-readable medium of claim 25, further comprising instructions executable to:
perform AND operation between the bits passed through the cascade of OR gates and a first bit-mask to obtain a range limited sequence of random numbers.

28. The computer-readable medium of claim 27, further comprising instructions executable to:
perform OR operation between bits of the range limited sequence and a second bit-mask to obtain another sequence of random numbers with a PDF having whitened low-value portions.

29. The computer-readable medium of claim 25, further comprising instructions executable to:
decouple the first sequence from the second sequence using a controllable multiplexor.

30. The computer-readable medium of claim 29, further comprising instructions executable to
perform bit-level operations using an output of the multiplexer, bits of the first sequence and bits of the other sequence to generate the second sequence of pseudo-random numbers with the programmable PDF.

31. The computer-readable medium of claim 25, further comprising instructions executable to:
perform OR operation between the second sequence of pseudo-random numbers and a bit-mask to adjust the programmable PDF of the second sequence.

32. The computer-readable medium of claim 25, further comprising instructions executable to:
generate the sequence of random numbers by using a first Gold Code Generator, and
generate the other sequence of random numbers by using a second Gold Code Generator separate from the first Gold Code Generator.

* * * * *